United States Patent
Stathakis et al.

(10) Patent No.: US 11,418,367 B2
(45) Date of Patent: Aug. 16, 2022

(54) CHANNEL ESTIMATION IN A MULTI-LAYER SYSTEM

(71) Applicant: Telefonaktiebolaget LM Ericsson (publ), Stockholm (SE)

(72) Inventors: Efthymios Stathakis, Stockholm (SE); Zhao Wang, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/772,438

(22) PCT Filed: Dec. 14, 2017

(86) PCT No.: PCT/EP2017/082868
§ 371 (c)(1),
(2) Date: Jun. 12, 2020

(87) PCT Pub. No.: WO2019/114973
PCT Pub. Date: Jun. 20, 2019

(65) Prior Publication Data
US 2021/0075645 A1    Mar. 11, 2021

(51) Int. Cl.
*H04W 4/00* (2018.01)
*H04L 25/02* (2006.01)
*H04L 5/00* (2006.01)

(52) U.S. Cl.
CPC ........ *H04L 25/0216* (2013.01); *H04L 5/0023* (2013.01); *H04L 25/022* (2013.01); *H04L 25/0222* (2013.01)

(58) Field of Classification Search
None
See application file for complete search history.

(56) References Cited

U.S. PATENT DOCUMENTS

| | | | |
|---|---|---|---|
| 6,744,814 B1 * | 6/2004 | Blanksby | H04L 25/03235 375/229 |
| 7,453,793 B1 * | 11/2008 | Jones, IV | H04L 25/0216 370/203 |

(Continued)

FOREIGN PATENT DOCUMENTS

EP     2381632 A1     4/2010

OTHER PUBLICATIONS

E. Dahlman, S. Parkvall, and J. Skold in 4G LTE/LTE-Advanced for Mobile Broadband, Academic Press, 2011, pp. 216-226, consisting of 11-pages.

(Continued)

*Primary Examiner* — Clemence S Han
(74) *Attorney, Agent, or Firm* — Christopher & Weisberg, P.A.

(57) ABSTRACT

A method in a wireless receiver for estimating a channel. The method includes receiving a signal comprising a plurality of transmission layers, each layer having at least one reference signal according to a predefined reference signal sequence; determining a window size for performing a sampling operation, wherein the operation is performed in a transformed domain of the received signal; selecting a channel tap length, from a range of channel tap lengths, wherein the selection is based on the window size, a noise mean and a noise variance. The channel estimation is performed from a reference signal sequence for the at least one reference signal and based on samples corresponding to the selected channel tap length.

18 Claims, 13 Drawing Sheets

(56) References Cited

U.S. PATENT DOCUMENTS

2012/0182857 A1* 7/2012 Bertrand ............. H04J 13/0062
370/210
2012/0281572 A1* 11/2012 Lundin ................. H04L 43/106
370/252

OTHER PUBLICATIONS

International Search Report and Written Opinion dated Aug. 13, 2018 for International Application No. PCT/EP2017/082868 filed on Dec. 14, 2017, consisting of 13-pages.
Dai et al. "Non-Orthogonal Multiple Access for 5G: Solutions, Challenges, Opportunities, and Future Research Trends"; Software Defined 5G Networks For Anything as a Service; IEEE Communications Magazine; Sep. 2015, consisting of 8-pages.
Zhou et al. "DCT-Based Channel Estimation Techniques for LTE Uplink" National Mobile Communications Research Laboratory; China, 2009, consisting of 5-pages.
Raghavendra et al. "Improving Channel Estimation in OFDM Systems for Sparse Multipath Channels", IEEE 5th Workshop on Signal Processing Advances in Wireless Communications, 2004, consisting of 4-pages.
3GPP TSG RAN WG1 Meeting #88 R1-1701553; Title: Final Report of 3GPP TSG RAN WG1 #AH1_NR v1.0.0 (Spokane, USA, Jan. 16-20, 2017); Source: MCC Support; Document for: Approval; Location and Date: Athens, Greece, Feb. 13-17, 2017, consisting of 106-pages.
3GPP TSG RAN WG1 Meeting #90bis R1-1716941; Title: Final Report of 3GPP TSG RAN WG1 #90 v1.0.0 (Prague, Czech Rep, Aug. 21-25, 2017); Source: MCC Support; Document for: Approval; Location and Date: Prague, Czech Rep, Oct. 9-13, 2017, consisting of 172-pages.

* cited by examiner

CHANNEL ESTIMATION IN A MULTI-LAYER SYSTEM

CROSS-REFERENCE TO RELATED APPLICATIONS

This application is a Submission Under 35 U.S.C. § 371 for U.S. National Stage Patent Application of International Application Number: PCT/EP2017/082868, filed Dec. 14, 2017 entitled "CHANNEL ESTIMATION IN A MULTI-LAYER SYSTEM," the entirety of which is incorporated herein by reference.

TECHNICAL FIELD

Embodiments herein relate generally to a base station and a method in the base station, and to a User Equipment (UE) and a method in the user equipment. More particularly the embodiments herein relate to radio communications and, in particular, to channel estimation in a multi-layered transmission system.

BACKGROUND

Overlapping transmissions may be designed to result in better performance, compared to orthogonal transmission. By allowing for overlapping/interfering transmissions, it is possible to significantly increase the system throughput and user equipment (UE) capacity. Such approaches have been adopted for multiple input multiple output (MIMO) and multi-user MIMO, included in $3^{rd}$ Generation Partnership Project (3GPP) since Long Term Evolution (LTE) release 8. Such details are described by E. Dahlman, S. Parkvall, and J. Skold in "4G LTE/LTE-Advanced for Mobile Broadband, 2nd ed. Academic Press, 2014.

In future radio systems, for example fifth generation systems such as 3GPP New Radio (NR) a new solution is considered. In NR, Non-Orthogonal Multiple Access (NOMA) is studied, wherein the UL UE transmissions are overlapping, yet some preprocessing via frequency spreading is conducted at the transmitter side. This approach is discussed by L. Dai et al., in "Non-orthogonal multiple access for 5G: solutions, challenges, opportunities, and future research trends," *IEEE Commun. Magazine*, vol. 53, no. 9, pp. 74-81, September 2015.

The purpose of these improved multiple access techniques is to achieve higher communication rates or increase the number of UEs that can access the resources simultaneously. In NR, the target is to support up to 16 layers for eMBB UEs MIMO and an even higher number of UEs in mMTC UL.

In such scenarios, the task of the base station, for example a gNB in an NR system, is to successfully separate and decode the streams of interest by means of a multi-user detector.

However, when multiple transmissions occupy the same time/frequency resources, then a critical task for successfully decoding the data is to obtain reliable estimates of the channel that corresponds to each of the overlapping layers. This task is more complicated, compared to single layer transmission, because of the arising pilot contamination issue. The pilot signals, or demodulation reference signal (DMRS), sequences interfere with each other and as a result render the channel estimation (CE) task more difficult; especially in combination with channel dispersion in the time-domain which results in frequency-selectivity.

Channel estimation in the frequency domain determines the frequency domain channel taps based on received pilot signals comprising known symbols. A channel tap is a discrete impulse representing a sample of the received signal. The channel impulse response, comprising the set of discrete channel taps needs to be estimated to decode/demultiplex received unknown symbols for a given channel.

With increased transmission layers and multi-user MIMO knowledge of the channel covariance is needed to account for channel fading. A channel covariance matrix is used to apply the channel covariance in a channel estimation procedure Channel estimation using discrete cosine transform (DCT) is considered by Zhou M et al. "DCT-based channel estimation techniques for LTE uplink," in *IEEE PIMRC*, pp, 1034-1038, Tokyo, Japan, April 2010. DCT may be used instead of fast Fourier transform (FFT) and/or discrete Fourier transform (DFT) spread orthogonal frequency division multiplex (OFDM), DFT-S-OFDM and channel estimation using minimum mean-square error (MMSE) in DCT-domain is described.

SUMMARY

In one embodiment a method is provided in a wireless receiver for estimating a channel. The method comprises receiving a signal comprising a plurality of transmission layers, each layer comprising at least one reference signal according to a predefined reference signal sequence. The method further comprises determining a window size for performing a sampling operation, wherein the operation is performed in a transformed domain of the received signal. The method further comprises selecting a channel tap length, from a range of channel tap lengths, wherein the selection is based on the window size, a noise mean and a noise variance. The channel estimation is performed from a reference signal sequence for the at least one reference signal and based on samples corresponding to the selected channel tap length.

The receiver may compute a range of channel tap lengths and select the optimal one.

An advantage is that the window size and channel tap length can dynamically adapt to the channel conditions, without requiring knowledge of the channel state information. Advantageously embodiments do not require the use of channel covariance matrix information.

Further, embodiments advantageously do not require knowledge of the delay spread. The delay spread estimation can be implicitly obtained in the proposed window selection method.

The method benefits from increasing PRG size, where a PRG comprises contiguous PRBs, to provide more reliable estimates. For a fixed number of layers, the performance improves from larger PRBs.

A high number of layers can be supported, assuming sufficiently large PRGs to reliably perform the channel estimation.

Further advantages are that the method can be implemented both in UL (gNB) and DL (UE) and the criterion computation is amenable to parallel implementation. The proposed window selection criterion can be used in conjunction with unitary transformation based channel estimators, for instance, DCT- or FFT-based estimators. The proposed window selection method can be used for delay spread and timing estimation based on DMRS or other types of reference signals such as Tracking RS (TRS).

In some aspects the selected channel tap length is selected to give the highest probability that the ratio of a power level of channel taps over a power level of noise within the window is maximized.

In one example the selected channel tap length, l*, is selected based on the computation:

$$l^* = \underset{1 \leq l \leq L}{\arg\min} \{L \times \log(\hat{\sigma}^2) + l \times (\hat{\mu}^2/\hat{\sigma}^2)\};$$

wherein L is the window size, l is a channel tap length in the range 1 to L, $\hat{\mu}^2$ is an estimated noise mean and $\hat{\sigma}^2$ is an estimated noise variance, from data samples in the window, L.

In another aspect, the noise mean value is estimated, $\hat{\mu}_k$, for layer k, and for a channel tap length, l, by:

$$\hat{\mu}_k = \frac{1}{L-l}\sum_{m=l+1}^{L} \hat{h}_k[m];$$

wherein, M is a multiple of the number of occupied elements of the layer, k, and $\hat{h}_k[m]$ is a vector obtained from a discrete cosine transform, DCT, of a point-wise multiplication of the received at least one reference signal vector with the conjugate of a reference signal vector sequence.

In a further aspect the noise variance is estimated, $\hat{\sigma}_k^2$, for a channel tap length l, by:

$$\hat{\sigma}_k^2 = \frac{1}{L-l-c}\sum_{m=l+1}^{L} |\hat{h}_k[m] - \hat{\mu}_k|^2;$$

wherein, M is a multiple of the number of occupied elements of the layer, k, and $\hat{h}_k[m]$ is a vector obtained from a discrete cosine transform, DCT, of a point-wise multiplication of the received at least one reference signal vector with the conjugate of a reference signal vector sequence, $\hat{\mu}_k$ is a predetermined noise mean or an estimated noise mean value and c is a constant.

In a further aspect the noise variance is estimated, $\hat{\sigma}_k^2$, for a channel tap length l, by:

$$\hat{\sigma}_k^2 = \frac{1}{L-l-c}\sum_{m=l+1}^{L} |\hat{h}_k[m] - \hat{\mu}_k|^2;$$

wherein, M is a multiple of the number of occupied elements of the layer, k, and $\hat{h}_k[m]$ is a vector obtained from a discrete cosine transform, DCT, of a point-wise multiplication of the received at least one reference signal vector with the conjugate of a reference signal vector sequence, $\hat{\mu}_k$ is a predetermined noise mean or an estimated noise mean value and c is a constant.

An advantage of this aspect is that the method does not require knowledge of the noise variance; this is inherently part of the algorithm, i.e. an estimate of the noise variance as a by-product of the channel estimation computation.

In another aspect, the method further comprises the receiver combining the metrics from all layers and reference signals by averaging or summing them to create a composite metric.

In one example the metric is computed according to:

$$l^* \triangleq \underset{1 \leq l \leq L}{\arg\min} \sum_{k=1}^{K} L_k(\hat{h}_k, l),$$

wherein the estimated channel length, measured in number of taps, is the same for all layers.

In another example the metric is computed according to:

$$l^* \triangleq \underset{1 \leq l \leq L}{\arg\min} (1/K)\sum_{k=1}^{K} L_k(\hat{h}_k, l),$$

and the estimated channel length, measured in number of taps, is the same for all layers.

In another embodiment, a wireless receiver for estimating a channel is provided, wherein the wireless receiver is configured to receive a signal comprising a plurality of transmission layers, each layer comprising at least one reference signal according to a predefined reference signal sequence. The wireless receiver is further configured to determine a window size for performing a sampling operation wherein the operation is performed in a transformed domain of the received signal. The wireless receiver is further configured to select a channel tap length, from a range of channel tap lengths, wherein the selection is based on the window size, a noise mean and a noise variance. The wireless receiver is also configured to perform channel estimation from a reference signal sequence for the at least one reference signal and based on samples corresponding to the selected channel tap length.

The receiver may be configured to compute a range of channel tap lengths and select the optimal one.

One advantage is that the window size and channel tap length can dynamically adapt to the channel conditions, without requiring channel covariance matrix information. In some examples the receiver is configured to select a channel tap length that gives the highest probability that the ratio of a power level of channel taps over a power level of noise within the window is maximized.

In another embodiment, a wireless receiver is provided, the wireless receiver comprising receiver circuitry, processor circuitry and memory and the wireless receiver is adapted for estimating a channel. The receiver circuitry is configured to receive a signal comprising a plurality of transmission layers, each layer comprising at least one reference signal according to a predefined reference signal sequence. The processor circuitry is configured to determine a window size for performing a sampling operation wherein the operation is performed in a transformed domain of the received signal. The processor circuitry is further configured to select a channel tap length, from a range of channel tap lengths, wherein the selection is based on the window size, a noise mean and a noise variance. The processor circuitry is further configured to perform channel estimation from a reference signal sequence for the at least one reference signal and based on samples corresponding to the selected channel tap length.

In some aspects the processor circuitry is further configured to select the channel tap length that gives the highest probability that the ratio of a power level of channel taps over a power level of noise within the window is maximized.

The receiver has the advantage that the window size and channel tap length can dynamically adapt to the channel conditions, without requiring channel covariance matrix information.

In another embodiment, a computer program, program product or carrier containing a computer program is provided. The computer program which, when run on a computer, is configured to receive a signal comprising a plurality of transmission layers, each layer comprising at least one reference signal according to a predefined reference signal sequence; to determine a window size for performing a sampling operation wherein the operation is performed in a transformed domain of the received signal; to select a channel tap length, from a range of channel tap lengths, wherein the selection is based on the window size, a noise mean and a noise variance, and to perform channel estimation from a reference signal sequence for the at least one reference signal and based on samples corresponding to the selected channel tap length.

The channel tap length can be selected to give the highest probability that the ratio of a power level of channel taps over a power level of noise within the window is maximized;

DETAILED DESCRIPTION

Wireless receivers such as user equipment and base stations in telecommunications systems, for example 3GPP new radio (NR), rely on channel estimation techniques based on pilots for correctly decoding received data. In multi-user multiple input multiple output MU-MIMO systems such wireless receivers receive signals comprising a plurality of transmission layers, each layer comprising at least one reference signal or pilot. Typically, a reference signal is according to a predefined reference signal sequence.

Figure 1:
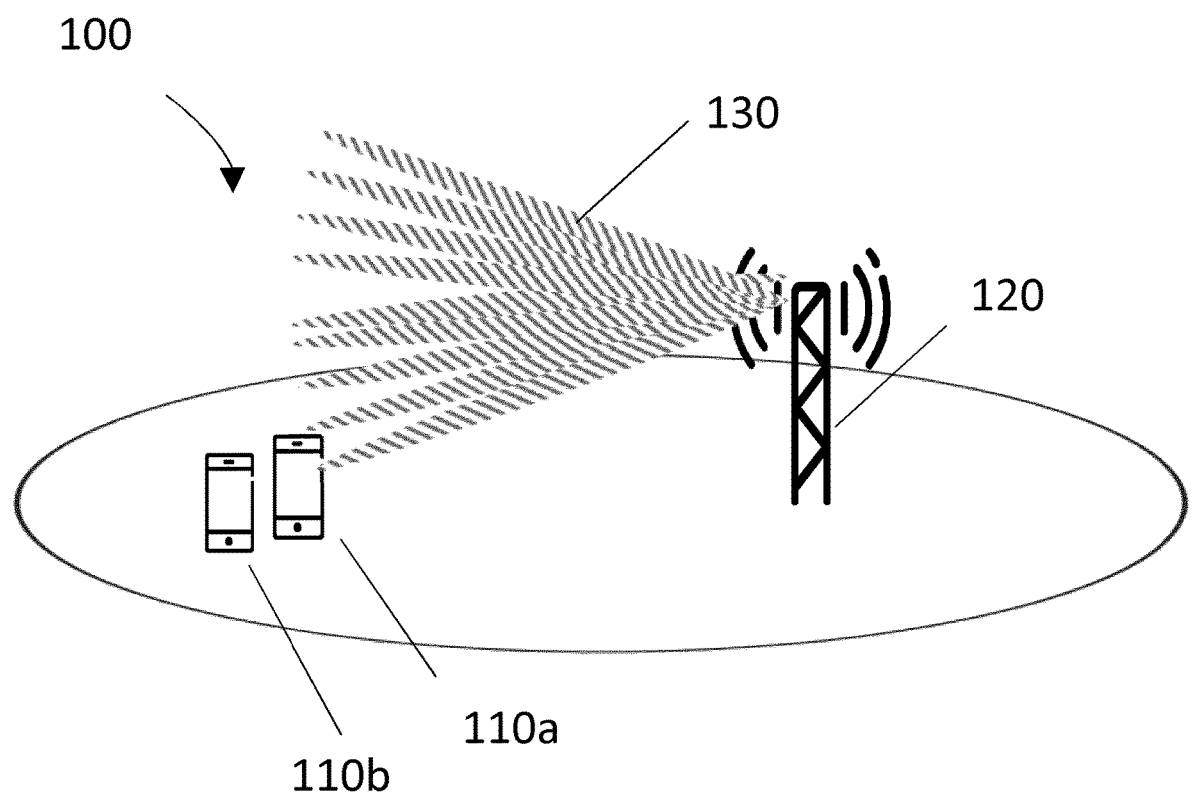
FIG. 1 is a block diagram illustrating an example network environment according to embodiments of the present disclosure.

FIG. 1 depicts a base station 120, for example a gNB, in a telecommunications system 100. The base station 120 is transmitting a plurality of beams 130, for example a MU-MIMO transmission, to served wireless devices 110a, 11b. Deployed telecommunications systems comprise many base stations, serving many wireless devices.

Figure 2:
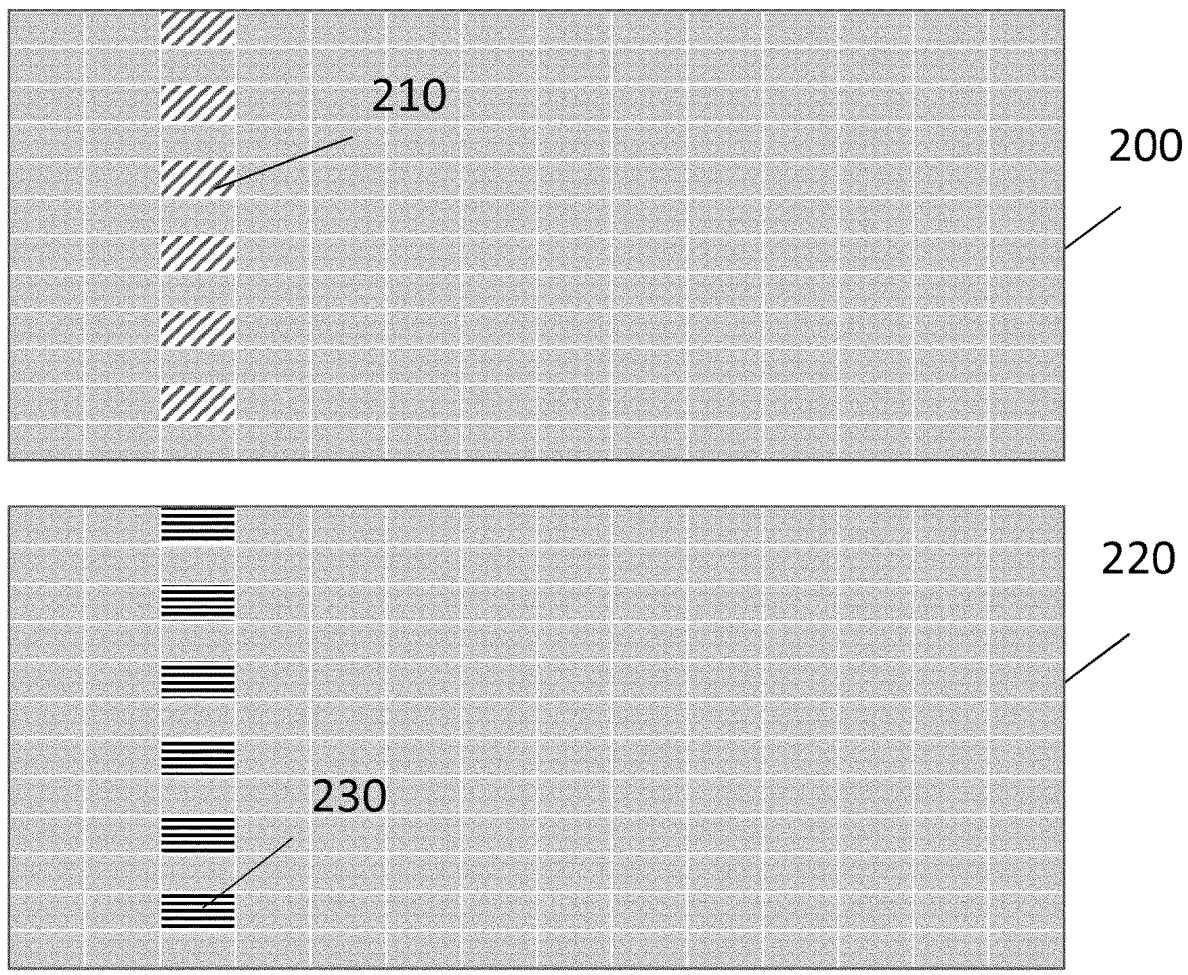
FIG. 2 is a block diagram illustrating resources of an example time-frequency grid according to embodiments of the present disclosure.

FIG. 2 depicts time-frequency resource grids for two layers 200, 220, of a plurality of transmission layers, each layer comprising at least one reference signal or pilot 210, 230. In some examples the reference signals 210, 230 are DMRS which are multiplexed by orthogonal cover code (OCC). For example, FIG. 2 may depict two layers of time-frequency resources in an NR system. As shown in FIG. 2 the DMRS, 210, 230, occupy the same time-frequency resources in each layer. In some examples a plurality of reference signals are multiplexed in one transmission layer. The number of resource elements depicted in FIG. 2 is illustrative only, likewise the number of resource elements occupied by a pilot or DMRS is illustrative only and not limiting.

In order to perform multi-user channel estimation (CE), robust computations are required. One way to separate independent data channels, using frequency-based channel estimation computations, is via orthogonal cover codes (OCCs) that are sets of K orthogonal sequences $\{s_k\}_{k=1}^{K}$. An example for K=4 is the shown by following table:

| $s_1$ | $s_2$ | $s_3$ | $s_4$ |
|---|---|---|---|
| 1 | 1 | 1 | 1 |
| 1 | 1 | −1 | −1 |
| 1 | −1 | 1 | −1 |
| 1 | −1 | −1 | 1 |

If the channel was completely flat then a simple correlation operation of the received reference signal with $s_k$ would suffice to remove the interference from the other DMRS sequences. However, the channel dispersion is a limiting factor, since the channel is not flat in practice. As a result, the OCC orthogonality is impaired. The higher the dispersion, the more frequency selective the channel becomes and the difficulty in mitigating reference signal, or pilot, contamination increases. As more DMRS sequences are overlaid with multi-layered transmissions, the more pronounced the contamination problem becomes.

Applying minimum mean-square error (MMSE) channel estimation techniques, directly on the frequency domain pilots, requires knowledge of the channel and noise statistics that need to be measured with sufficiently high accuracy.

One way to partially decrease the contamination among DMRS is to use a comb-like structure. According to the recent progress in 3GPP, comb-based DMRS patterns are intended to be included as type-I of the DMRS configurations for NR. In this case, the DMRS sequences are multiplexed into non-overlapping resource elements. However, with increasing comb-factor, the pilots are placed further apart hence less information is available for recovering the channel in the missing positions via interpolation.

To further enhance channel estimation, cyclic shifts can be used for pilots transmitted on the same comb for separating layers, i.e., phase-shifts in frequency. Cyclic phase shifting on a sequence is an implicit way of applying OCC on that sequence. This can help separate the channel in time after the application of, for example, an inverse discrete cosine transform (IDCT) operation. Since the channel estimation, in such an approach, takes place in the time domain or transformed domain, the actual channel is concentrated in a limited number of taps whereas the remaining taps contain only noise. Therefore, a critical task is to identify how many taps to keep, i.e., to ascertain that the channel exists within a window of L taps while the rest of the sample, outside of the window which defines the channel, is noise.

Figure 3:
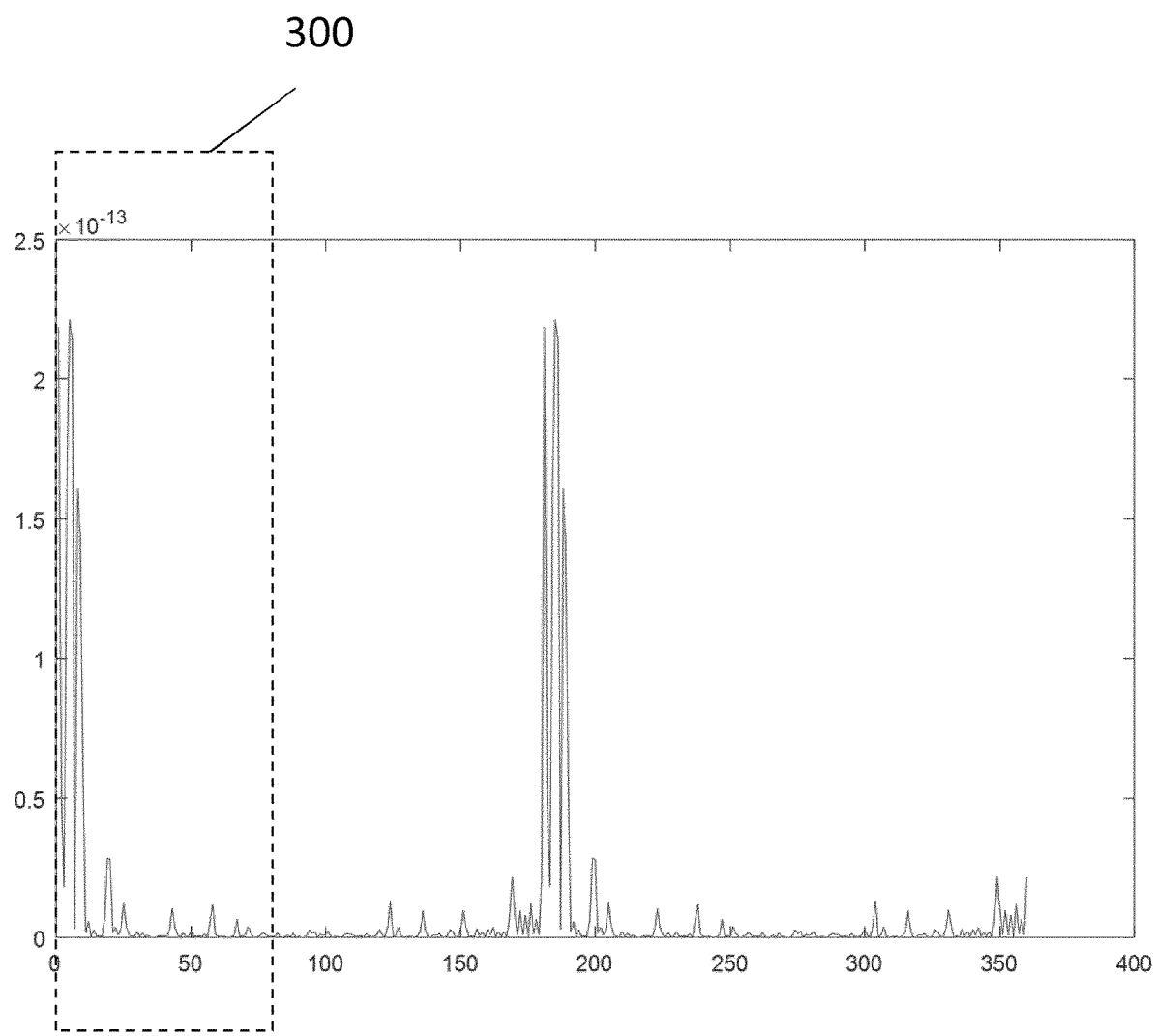
FIG. 3 is a block diagram illustrating channel tap selection according to embodiments of the present disclosure.

FIG. 3 depicts an example of channel tap selection from data samples comprising noise; the region 300 shows the selected channel taps.

If a small window is consistently selected, then at a high signal to noise ratio (SNR) it is possible that significant channel power is inadvertently discarded. On the other hand, if a long window is consistently selected then at low SNR too much noise would be included in the estimation. Having a fixed rule for window selection is not versatile and does not work well in all channel conditions, dictated by the delay spread of the channel conditions. The task of window selection becomes even more challenging in multi-layer transmission because, apart from the taps of the desired channel, taps of interfering channels are present in the sample set as well. This can be seen in FIG. 3 for the samples located close to index 200 of the x-axis.

Hence, the window size should be computed with a criterion which can automatically decide which samples in the transformed domain contain desired channel taps.

The maximum likelihood principle, for instance, in combination with the Akaike Information Criterion (AIC) may be used for selecting the window size. However, designing such an AIC for mixed and varying channel scenarios is non-trivial and the channel tap model-order selection criterion would typically be based on heuristics.

In an embodiment of this disclosure the estimation of channel-tap length l within the search window of length L is proposed. The principle of the window selection criterion method is to apply hypothesis testing in the received data samples. For example (Hypothesis):

for some l, that satisfies 1≤l≤L, the desired channel taps lie in the window of [1:l].

This is equivalent to stating that only noise samples lie in the window [l+1:L]. In one embodiment, the selection of a channel tap length is performed, from a range of channel tap lengths, wherein the selection is based on the window size, a noise mean and a noise variance.

In some examples the selected channel tap length gives the highest probability that the ratio of a power level of channel taps over a power level of noise within the window is maximized. In some examples this may be described as the Decision rule wherein the optimal channel tap-length l* is summarized in the following formula:

$$l^* = \underset{1 \leq l \leq L}{\arg\min} \{L \times \log(\hat{\sigma}^2) + l \times (\hat{\mu}^2 / \hat{\sigma}^2)\}$$

where L denotes the search window size, and $\hat{\mu}$, $\hat{\sigma}^2$ are the estimated noise mean and variance from the data samples in the search window L, respectively. The technical effect of this computation is invariant to scaling (multiply with scalar) and translation (adding a constant), for example:

$$\underset{1 \leq l \leq L}{\arg\min} \{L \times \log(\hat{\sigma}^2) + l \times (\hat{\mu}^2 / \hat{\sigma}^2)\} \times \beta + \alpha$$

gives the same result for any real-valued β and α.

The embodiment proceeds by performing channel estimation from a reference signal sequence for at least one reference signal and based on samples corresponding to the selected channel tap length.

Estimating the noise mean and noise variance may be achieved in various ways, which may result in different forms of the above disclosed criterion. Details of such methods are described below.

The procedures involved in performing the channel estimation in a wireless receiver will now be described in more detail and, in particular, with reference to the sequence in FIG. 4.

Figure 4:
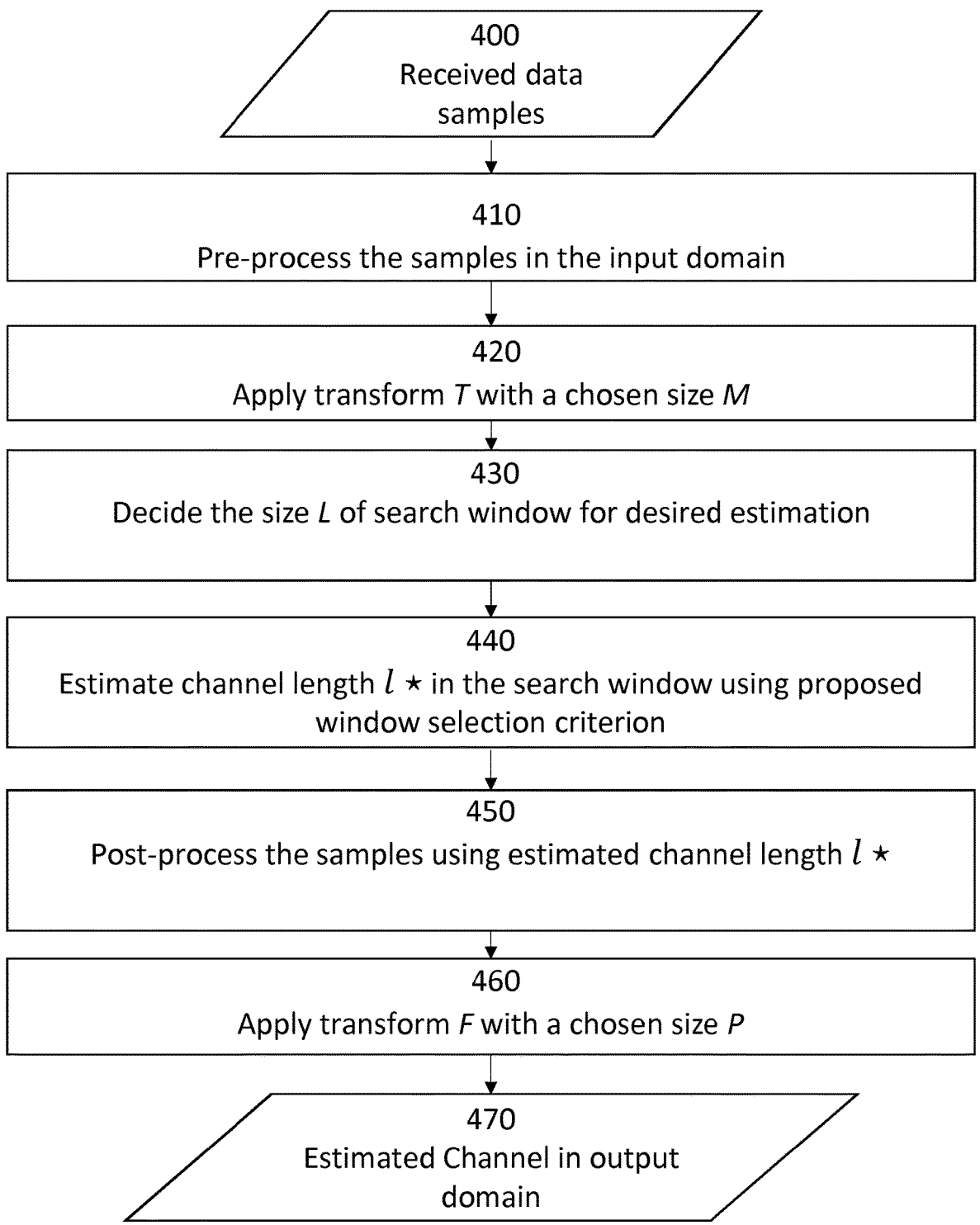
FIG. 4 is a flow diagram according embodiments of the present disclosure.

FIG. 4 represents a process performed by a wireless receiver, such as in a UE or a gNB. The process is derived for multi-layer transmissions, such as MU-MIMO transmissions, however the principles may be applied equally to a single layer transmission and single user MIMO transmissions.

A scheduler, for example in a base station, allocates time/frequency resources for the transmission, i.e., selects the physical resource group (PRG) resources. In some examples the PRG resources comprise K physical resource blocks (PRBs) and occupy N subcarriers. In some examples there are 12 subcarriers per PRB. For example:

$N_{subc} \triangleq 12K$ subcarriers.

The bases station, e.g. gNB configures a reference signal (RS) sequence. The RS sequence may be derived from a combination of a base sequence, a cyclic shift and comb-multiplexing. The same procedure may apply to both UL and DL.

Referring to FIG. 3, the wireless receiver, receives a signal comprising multiple transmission layers and at least one pilot or reference signal per layer. The receiver extracts the received signal vector y at the frequency band where the multi-layer transmission is located. At step 400 the received signal is sampled to obtain data samples.

At step 410 the samples are pre-processed in the input domain. In some examples this includes match filtering. For example, the RS sequence for the k-th layer, may be referred to as $s_k$, for the k-th layer, a point-wise multiplication of the received signal y with the conjugate RS vector sequence $s^*_k$ is performed, in other words we perform matched filtering with $s_k$. This operation yields the frequency channel of the desired layer with the contamination from the other layers' pilots. The operation may be described as:

$$\tilde{h}_k \triangleq s^*_k \odot y.$$

At step 420 the receiver transforms the filtered signal by applying a transform function such as a DCT operation. As described earlier DCT provides improvements over other types of unitary transformations such as FFT/DFT, however the embodiments described herein may also be applied using FFT/DFT. In the example, the DCT operation is applied using a DCT size M, where M is the length of the desired layer and matches the number of occupied/active elements of the k-th layer's reference signal. The size of the transformation M is a multiple of the number of occupied elements of the desired layer, which adapts with the oversampling rate and comb factor. The resulting vector provides the sequence to which the channel tap selection can be applied. This may be expressed as:
the vector:

$$\hat{h}_k \triangleq \mathrm{DCT}(\tilde{h}_k).$$

At step 430, in FIG. 4, the receiver determines the size of the search window for the desired estimation. For example the search window size may be determined to be size L. The maximum size may be selected according to system parameters. For instance, L can be calculated as the maximum possible channel dispersion in the transformed domain.

At step 440 the receiver estimates the channel length l* in the search window using the determined window selection criterion.

At step 450 the receiver post-processes the filtered data samples using the estimated channel length. At step 460 the receiver applies a further transform stage, for example IDCT. In some examples the transform has a size P. In some examples P is equal to the input transform size. The output of the transform process provides the channel estimate in the output domain, at step 460.

Figure 5:
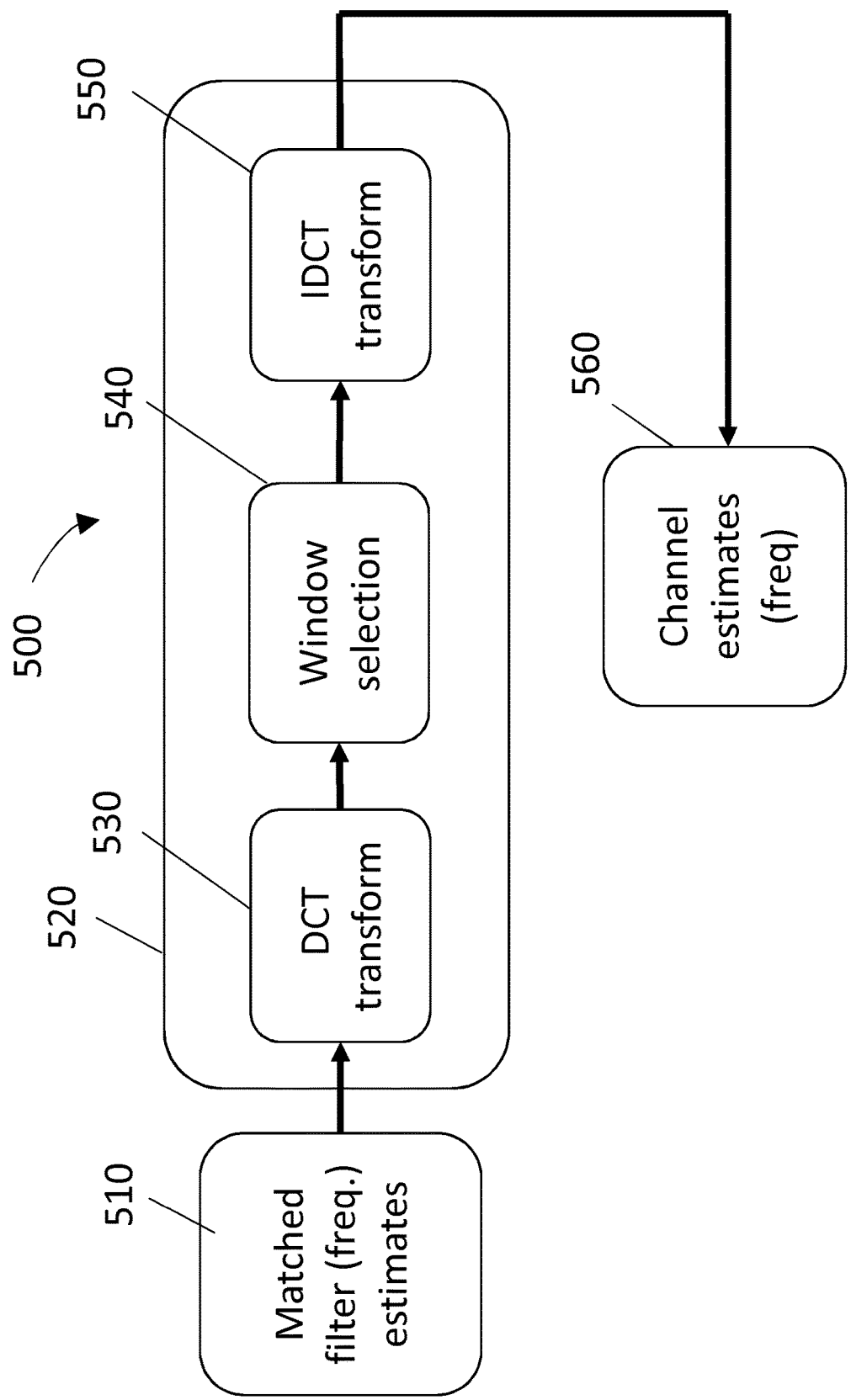
FIG. 5 is a block diagram illustrating embodiments of the present disclosure.

The process of FIG. 4 can be described schematically, for example in FIG. 5 the logical function 500, comprising function blocks of the process is depicted. The point-wise multiplication of the received signal vector is performed in function 510. Function block 530 performs the transform function, e.g. a DCT. Function block 540 performs the window selection and function block 550 returns the signal vector to the frequency domain, e.g. an IDCT. The function blocks 530, 540 and 550 may be logically grouped into the transformed domain channel estimator function block 520 wherein specific embodiments described herein apply. Function block 560 performs the channel estimation function based on the computed parameters, in particular the optimum channel tap length.

Figure 6:
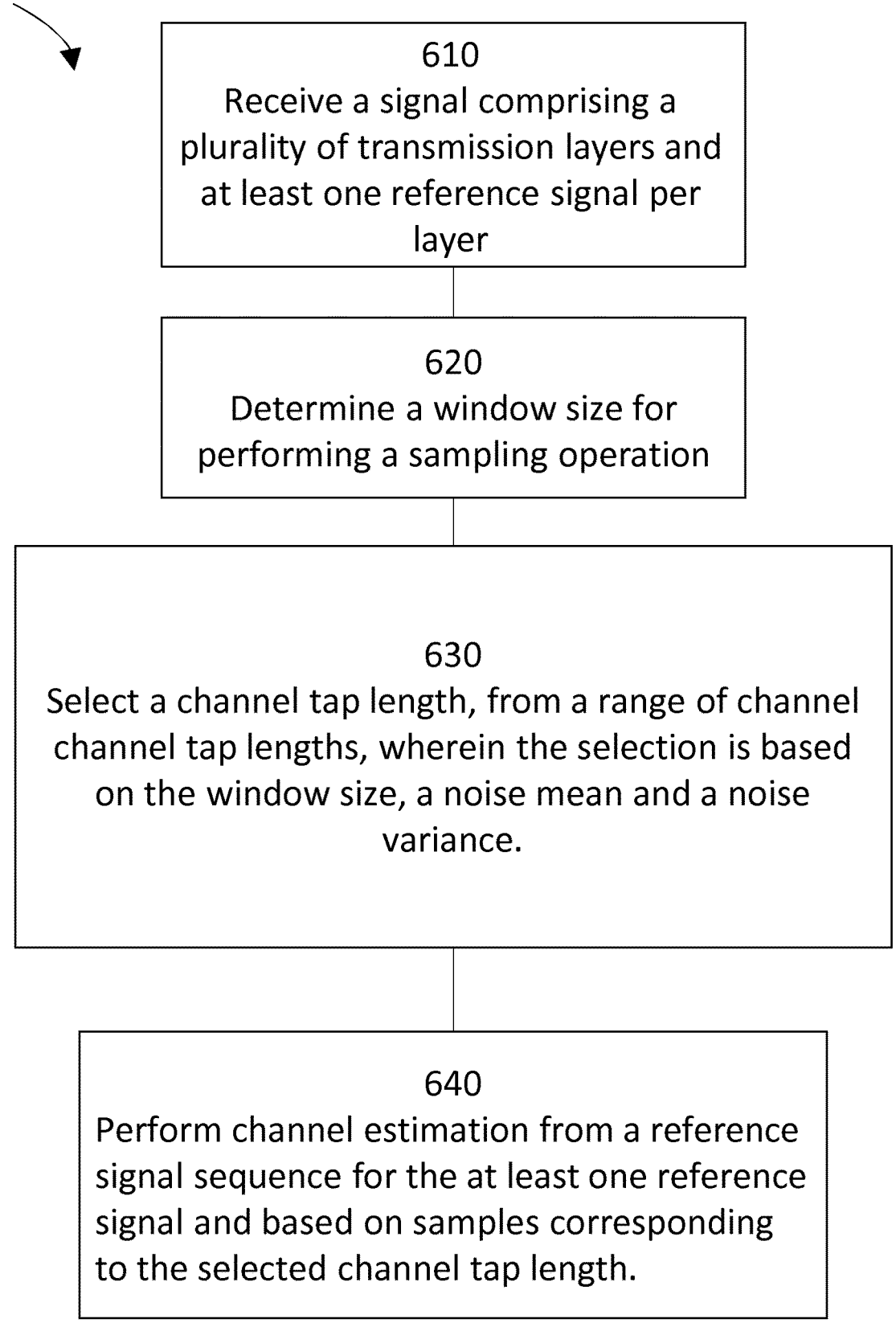
FIG. 6 is a flow diagram illustrating example method embodiments of the present disclosure.

FIG. 6 describes a method 600 in a wireless receiver for estimating a channel. The wireless receiver, such as a UE or base station, receives a signal comprising a plurality of transmission layers and at least one reference signal per layer. The received signal may be scheduled by a base station and comprise a number of physical resource blocks. When the transmission is from the base station the method occurs in the UE or wireless device receiving the DL transmission. Likewise, when the transmission is from the UE or wireless device the method occurs in the base station, receiving an UL transmission. The receiver, at step 620, determines a window size for performing a sampling operation. The sampling operation is performed in a transformed domain of the received signal, as described above.

In some examples the window length is determined based on one or more of: a maximum channel dispersion in the transformed domain; a cross-layer interference distribution in the transformed domain; and an estimate of the noise mean and the noise variance.

In some examples the window length is the minimum of the equivalent Cyclic-Prefix, CP, length in the transformed domain and the interference-free taps length, wherein one of frequency domain OCCs, or cyclic shift, CS, is used for multiplexing the layers.

In some embodiments, the maximum search window length can also be a fraction of the length calculated by considering the maximum channel dispersion and the interference distribution. This may be implemented due to numerical stability reasons. For instance, the choice of L should always guarantee that there will be sufficient number of samples for estimating noise mean or variance.

The method proceeds at step 630 and the receiver selects a channel tap length, from a range of channel tap lengths. The selection is based on the window size, a computed noise mean estimate and a computed noise variance estimate.

In some examples channel tap length is selected to give the highest probability that the ratio of a power level of channel taps over a power level of noise within the window is maximized.

In some examples the data samples are sorted in the transformed domain before determining the window size and the window selection is based on the sorted samples. For instance, the samples may be sorted based on amplitude, e.g. according to the descending order of the amplitudes (the absolute value of magnitudes). The window selection may henceforth focus on the samples with large amplitudes.

In some examples the optimum channel tap length l* is selected based on the following relation:

$$l^* = \arg\min_{1 \le l \le L} \{L \times \log(\hat{\sigma}^2) + l \times (\hat{\mu}^2 / \hat{\sigma}^2)\}$$

where L is the window size, l is a channel tap length in the range 1 to L, $\hat{\mu}^2$ is an estimated noise mean and $\hat{\sigma}^2$ is an estimated noise variance, from data samples in the window, L.

In further examples for each value l∈{1, . . . , L}, where l is the rightmost channel tap index and L is the window size, the receiver computes the quantity $L_k(\hat{h}_k, l) \triangleq L \times \log \hat{\sigma}_k^2 + l \times (\hat{\mu}_k^2/\hat{\sigma}_k^2)$, where $\hat{\mu}_k$, $\hat{\sigma}_k^2$ are the estimated noise mean and variance of the k-th layer, respectively.

The optimum channel tap length $l^*_k$ for the k-th layer's channel selection may be expressed by:

$$l^*_k \triangleq \arg\min_{1 \le l \le L} L_k(\hat{h}_k, l),$$

At step 640 the method proceeds with the receiver performing a channel estimation from a reference signal sequence for the at least one reference signal and based on samples corresponding to the selected channel tap length. The channel estimation is performed in the frequency domain.

In some examples the channel estimation procedure comprises the receiver performing an inverse discrete cosine transform, IDCT, operation of size L on a vector $\bar{h}_k$, for a layer k, wherein the vector $\bar{h}_k$ may be represented by:

$$\bar{h}_k \triangleq [\hat{h}_k^H(1:l^*_k) 0_{L-l^*_k}^H]^H;$$

wherein $$\hat{h}_k^H(1:l^*_k)$$

is a vector of the first $l^*_k$ elements and $l^*_k$ is the selected channel tap length for layer k and $0_{L-l^*_k}$ is an all-zero vector of length $L-l^*_k$, and H is the matrix Hermitian operator, i.e., conjugate and transpose matrix operation.

In other examples an inverse fast Fourier transform (IFFT) or inverse discrete Fourier transform (IDFT) procedure is performed by the receiver in order to perform the channel estimation in the frequency domain. The transform can be a general unitary matrix based transformation, as long as it is inverse to the original transform which has been applied before the window selection, namely the block 530 of FIG. 5. Therefore, it holds for IDCT/IFFT/IDFT etc.

The disclosed embodiments provide the benefit of increasing the physical resource group (PRG) size, where a PRG comprises contiguous PRBs, to provide more reliable estimates. For fixed number of layers, the performance improves from larger PRBs.

A high number of layers can be supported, assuming sufficiently large PRGs to perform the channel estimation reliably.

The method does not require knowledge of the channel covariance matrix, as is required by conventional methods. Additionally, the method does not require knowledge of the delay spread. The delay spread estimation is implicitly obtained in the proposed window selection method.

Further advantages are that the method can be implemented both in UL (gNB) and DL (UE) and the criterion computation is amenable to parallel implementation.

In some embodiments the receiver estimates the noise mean value. For example, the receiver may, for any given channel tap length l, compute the noise mean value estimate $\hat{\mu}_k$ according to:

$$\hat{\mu}_k = \frac{1}{L-l} \sum_{m=l+1}^{L} \hat{h}_k[m]$$

wherein, L is a multiple of the number of occupied elements of the layer, k, and $\hat{h}_k[m]$ is a vector obtained from a discrete cosine transform, DCT, of a point-wise multiplication of the received at least one reference signal vector with the conjugate of a reference signal vector sequence. In other embodiments the noise mean is known a priori. In this case, the known mean value is used instead of an estimate.

In some embodiments the noise variance is estimated by the receiver. For example, the receiver may for any given channel tap length l, compute the noise variance estimate $\hat{\sigma}_k^2$ according to:

$$\hat{\sigma}_k^2 = \frac{1}{L-l-c} \sum_{m=l+1}^{L} |\hat{h}_k[m] - \hat{\mu}_k|^2,$$

where c is a constant that can be tuned to make the term $$\frac{1}{L-l-c}$$

a positive value. In another example c=0; in this case $\hat{\sigma}_k^2$ is a biased estimate. In other examples, c=1; in this case $\hat{\sigma}_k^2$ is an unbiased estimate. In other examples c=1.5; this value may be used in practice as a 'rule-of-thumb'.

In some embodiments, any of the abovementioned variance estimate $\hat{\sigma}_k^2$ are multiplied with the quantity $q^2(l)$, where:

$$q(l) \triangleq \frac{\sqrt{\frac{L-l-1}{2}} \Gamma\left(\frac{L-l-1}{2}\right)}{\Gamma\left(\frac{L-l}{2}\right)}$$

and $\Gamma(x) = \int_0^\infty t^{x-1} e^{-t} dt$ is the gamma function, before using it in the criterion, to provide a bias correction on the estimated variance.

In embodiments where the noise mean is known a priori, $\hat{\mu}_k$ is regarded as a known input instead of a parameter which needs to be estimated online. Represent the known noise mean as $\hat{\mu}_k = \mu$. The noise estimate $\hat{\mu}_k^2$ is computed according to:

$$\hat{\sigma}_k^2 = \frac{1}{L-l-c} \sum_{m=l+1}^{L} |\hat{h}_k[m] - \mu|^2.$$

When $\mu=0$, the decision rule of the proposed solution is simplified to:

$$l_k^* = \arg\min_{1 \le l \le L} \{\hat{\sigma}_k^2\} = \arg\min_{1 \le l \le L} \left\{ \frac{1}{L-l-c} \sum_{m=l+1}^{L} |\hat{h}_k[m]|^2 \right\}.$$

An advantage of these embodiments is that the method does not require knowledge of the noise variance, this is inherently part of the computation.

In some embodiments, the receiver combines the metrics from all layers/RSs, e.g., by averaging or summing them, to create a composite metric as follows:

$$l^* \triangleq \arg\min_{1 \le l \le L} \sum_{k=1}^{K} L_k(\hat{h}_k, l)$$

or equivalently:

$$l^* \triangleq \arg\min_{1 \le l \le L} (1/K) \sum_{k=1}^{K} L_k(\hat{h}_k, l).$$

The estimated channel length (measured in number of taps) is the same for all layers, i.e.:

$$l^*_k = l^* \forall k,$$

This is relevant for multi-antenna transmitters, with collocated antennas, because the paths/reflections should be the same. The angle-of-arrivals and angle-of-departures, within each tap, will differ among the tx-rx antenna links but the number of paths can be assumed to be the same.

In embodiments the channel estimation may be performed iteratively. For example, an iterative method as follows:

i) the channel length $l^*_k$ is determined (measured in taps in the transform domain) for the k-th layer. The vector $\hat{w}_k$ is assumed to contain only noise. The vector may be defined as:

$$\hat{w}_k \triangleq [\hat{h}_k^H[l^*_k+1] \ldots \hat{h}_k^H[L]]^H$$

ii) the vector $\hat{w}_k$ is formulated as $\hat{w}_k \triangleq [0_{l^*_k}^H \hat{w}_k^H]^H$ iii) the inverse transform, e.g, IDCT, on $\overline{w}_k$ is performed to obtain an estimate $\tilde{w}_k$ of the noise vector on layer k, repeated for all layers.

iv) the vector, $\tilde{h}_{k(i-1)}$ is subtracted from the vector $\tilde{h}_{k(i)} \triangleq \tilde{h}_{k(i-1)} - \tilde{w}_k$, in which $\tilde{h}_{k(i)}$ represents the matched filter output in the i-th iteration for layer k.

v) the channel estimation process, described previously, is performed based on $\tilde{h}_{k(i)}$.

vi) steps i) to v) are iterated until at least one of the following two conditions is satisfied:
  a. A predetermined number of iterations has been reached, e.g., i=5.
  b. A criterion is fulfilled, e.g., the (mean) Euclidean distance between the channel estimates, obtained over two consecutive iterations i−1 and i of the hypothesis testing, is smaller than a constant $\in$.

In another embodiment, an iterative method is as follows:
i) the channel estimates h'$_k$ is determined in the original (frequency) domain, i.e., through an inverse (e.g., IDCT) transform of $\bar{h}_k$ according to:

$$h'_k \triangleq \text{IDCT}(\bar{h}_k)$$

an estimate of the noise is obtained, in the frequency domain, according to:

$$\tilde{w} = y - \Sigma_{k=1}^{K} s_k h'_k$$

ii) match filtering of $\tilde{w}$ with $s_k$ is performed to obtain an estimate of the noise contribution on layer k according to:

$$\widetilde{w_k} = s^*_k \odot \tilde{w}$$

iii) the transform $\widetilde{w_k}$ is performed, e.g, by performing a DCT, to obtain an estimate $\overline{w}'_k$ of the noise vector on the DCT domain.

iv) $\overline{w}'_k$ is subtracted from the original value of $\bar{h}_{k(i-1)}$ obtained from the channel estimation step, based on $\hat{h}_{k(i)}$, with the previous iteration, i.e. i−1 providing:

$$\hat{h}_{k(i)} \triangleq \hat{h}_{k(i-1)} - \overline{w}'_k$$

performed for all layers, v) the channel estimation process is performed, as described previously, based on $\hat{h}_{k(i)}$ steps i) to v) are repeated until at least one of the following two conditions is satisfied:
   a. A predetermined number of iterations has been reached, e.g., i=5.
   b. A criterion is fulfilled, e.g., the (mean) Euclidean distance between the channel estimates, obtained over two consecutive iterations i−1 and i of the hypothesis testing, is smaller than a constant $\in$.

In some embodiments methods disclosed herein are used to estimate the delay spread of the channel used for setting up other types of channel estimators. In some implementations, a wiener filter for frequency domain channel estimator is set up by the delay spread estimated from the proposed method. The proposed window selection method is thus advantageous for for delay spread and timing estimation based on DMRS or other types of reference signals such as Tracking RS (TRS).

The proposed window selection criterion can be used for all unitary transformation based channel estimator, for instance, DCT- or FFT-based estimator.

The embodiments disclosed herein pertain to wireless receivers for use in telecommunications systems. Such wireless receivers are comprised in various radio communications equipment. More generally such equipment may be categorised as either a wireless device, or user equipment or a network node such as a radio base station. These two types of apparatus will now be discussed in more detail, with regards to the specific embodiments disclosed. It will be understood by those skilled in the art that wireless receivers suitable for performing the embodiments disclosed herein may be implemented in other types of apparatus and thus the descriptions for a base station and a UE are non-limiting examples.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another WD and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Examples of network nodes or base stations include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, and transmission nodes.

In an embodiment a wireless receiver comprising receiver circuitry processor circuitry and memory, is adapted for estimating a channel, wherein the receiver circuitry is configured to receive a signal comprising a plurality of transmission layers, each layer comprising at least one reference signal according to a predefined reference signal sequence; and the processor circuitry is configured to: determine a window size for performing a sampling operation wherein the operation is performed in a transformed domain of the received signal; select a channel tap length, from a range of channel tap lengths, wherein the selection is based on the window size, a noise mean and a noise variance; and perform channel estimation from a reference signal sequence for the at least one reference signal and based on samples corresponding to the selected channel tap length.

In some aspects of the embodiment, the processor circuitry is further configured to select channel tap length that gives the highest probability that the ratio of a power level of channel taps over a power level of noise within the window is maximized.

In some aspects of the embodiment, the processor circuitry is further configured to select the channel tap length, l*, based on the computation:

$$l^* = \arg\min_{1 \le l \le L} \{L \times \log(\hat{\sigma}^2) + l \times (\hat{\mu}^2/\hat{\sigma}^2)\};$$

wherein L is the window size, l is a channel tap length in the range 1 to L, $\hat{\mu}^2$ is an estimated noise mean and $\hat{\sigma}^2$ is an estimated noise variance, from data samples in the window, L.

In some aspects of the embodiment, the processor circuitry is further configured to dynamically adapt the window size and channel tap length based on channel conditions.

In some aspects of the embodiment, the processor circuitry is further configured to determined based on one or more of: a maximum channel dispersion in the transformed domain; a cross-layer interference distribution in the transformed domain; and an estimate of the noise mean and the noise variance.

In some aspects of the embodiment, the processor circuitry is further configured to determine the window length to be the minimum of: the equivalent Cyclic-Prefix, CP, length in the transformed domain; and the interference-free taps length, wherein one of frequency domain orthogonal cover codes, OCCs, or cyclic shift, CS, is used for multiplexing the layers.

In some aspects of the embodiment, processor circuitry is further configured to sort data samples in the transformed domain before the processor circuitry determines the window size and the window is determined based on the sorted samples.

In some aspects of the embodiment, the processor circuitry is further configured to perform the channel estimation comprising an inverse discrete cosine transform, IDCT, operation of size L on a vector $\bar{h}_k$, for a layer k, wherein the vector $\bar{h}_k \triangleq [\hat{h}_k^H(1{:}l^*_k) \; 0_{L-l^*_k}^H]^H$; wherein $\hat{h}_k^H(1{:}l^*_k)$ is a vector of the first $l^*_k$ elements, wherein $l^*_k$ is the selected channel tap length for layer k and $0_{L-l^*_k}$ is an all-zero vector of length $L-l^*_k$.

In some aspects of the embodiment, the processor circuitry is further configured to estimate the noise mean value, $\hat{\mu}_k$, for layer k, and for a channel tap length, l, by:

$$\hat{\mu}_k = \frac{1}{L-l} \sum_{m=l+1}^{L} \hat{h}_k[m];$$

wherein, L is a multiple of the number of occupied elements of the layer, k, and $\hat{h}_k[m]$ is a vector obtained from a discrete cosine transform, DCT, of a point-wise multiplication of the received at least one reference signal vector with the conjugate of a reference signal vector sequence.

In some aspects of the embodiment, the processor circuitry (720, 820) is further configured to estimate the noise variance, $\hat{\sigma}_k^2$, for a channel tap length l, by:

$$\hat{\sigma}_k^2 = \frac{1}{L-l-c} \sum_{m=l+1}^{L} |\hat{h}_k[m] - \hat{\mu}_k|^2;$$

wherein, L is a multiple of the number of occupied elements of the layer, k, and $\hat{h}_k[m]$ is a vector obtained from a discrete cosine transform, DCT, of a point-wise multiplication of the received at least one reference signal vector with the conjugate of a reference signal vector sequence, $\hat{\mu}_k$ is a predetermined noise mean or an estimated noise mean value and c is a constant such that $$\frac{1}{L-l-c}$$

is positive.

In some aspects of the embodiment, c has the value of one of 0, 1, and 1.5.

In some aspects of the embodiment, the processor circuitry is further configured to multiply the noise variance estimate $\hat{\sigma}_k^2$ with the quantity $q^2(l)$ before the processor circuitry (720, 820) selects the channel tap length, wherein:

$$q(l) \triangleq \frac{\sqrt{\frac{L-l-1}{2}} \; \Gamma\left(\frac{L-l-1}{2}\right)}{\Gamma\left(\frac{L-l}{2}\right)};$$

and $\Gamma(x) = \int_0^\infty t^{x-1} e^{-t} \, dt$ is the gamma function.

In some aspects of the embodiment, the receiver is further configured to combine the metrics from all layers and reference signals by averaging or summing them to create a composite metric.

In some examples, the metric is according to:

$$l^* \triangleq \arg\min_{1 \le l \le L} \sum_{k=1}^{K} L_k(\hat{h}_k, l),$$

wherein the estimated channel length, measured in number of taps, is the same for all layers In other examples the metric is according to:

$$l^* \triangleq \arg\min_{1 \le l \le L} (1/K) \sum_{k=1}^{K} L_k(\hat{h}_k, l);$$

and the estimated channel length, measured in number of taps, is the same for all layers.

Figure 7:
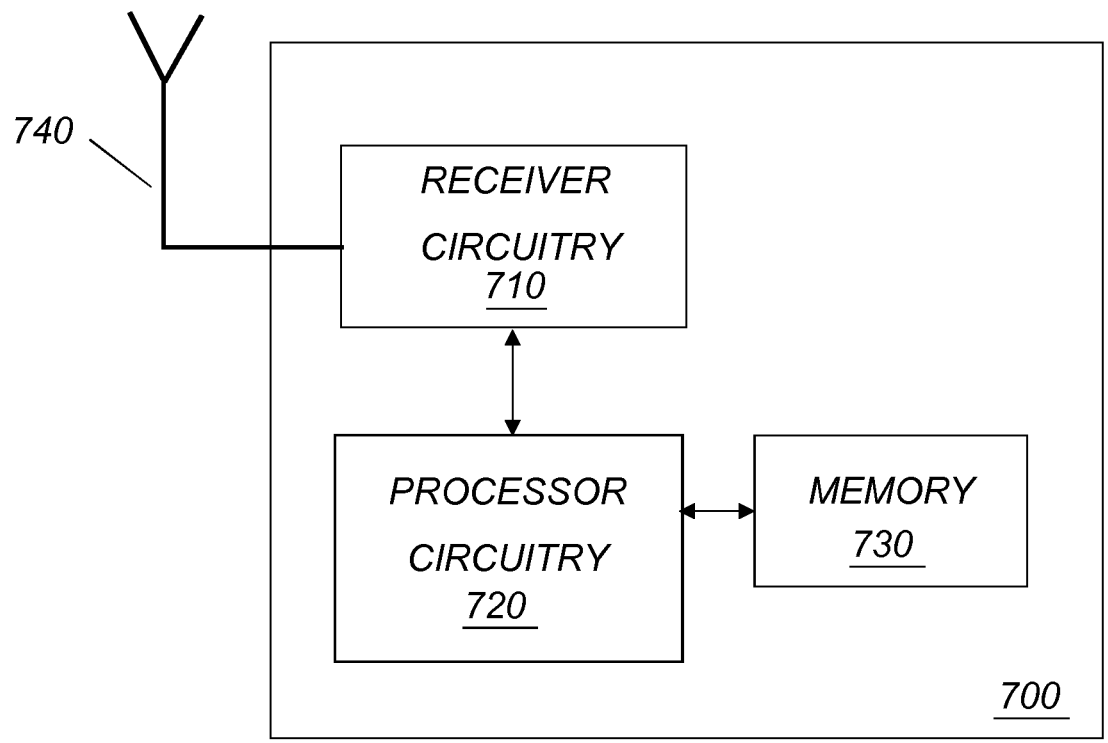
FIG. 7 is a block diagram illustrating example physical units of a device useful for implementing the methods described herein, according to one or more embodiments of the present disclosure.

FIG. 7 depicts an example wireless device or UE 700 as an example implementation of a wireless receiver for performing any one of the embodiments disclosed herein. The UE 700 comprising receiver circuitry 710, processor circuitry 720, a memory 730, and one or more antennas 740. The UE 700 may comprise multiple processor circuits, multiple memory circuits and multiple receiver circuits. The one or more antennas 740 may comprise multiple antenna elements as known by those skilled in the art to receive MIMO transmissions. The UE 700 may also comprise transmitter circuitry (not shown) and in some embodiments the receiver circuitry 710 is comprised within transceiver circuitry providing receive and transmit functions. The receiver circuitry is configured to receive one or more transmission layers via the one or more antennas and/or antenna elements. UE 700 may include multiple sets of one or more of the illustrated components for different wireless technologies supported by UE 700, such as, for example, GSM, WCDMA, LTE, NR, WiFi, WiMAX, or Bluetooth wireless technologies, just to mention a few. These wireless technologies may be integrated into the same or different chips or set of chips as other components within UE 700.

The UE 700 is suitably arranged for estimating a channel in a multi-layer, multi-user transmission system. The receiver circuitry 710 is configured to receive a signal comprising a plurality of transmission layers, each layer comprising at least one reference signal according to a predefined reference signal sequence. The processor circuitry 720 is configured to determine a window size for performing a sampling operation wherein the operation is performed in a transformed domain of the received signal. The processer circuitry 720 is further configured to select a channel tap length, from a range of channel tap lengths, wherein the selection is based on the window size, a noise mean and a noise variance. The channel tap length can be selected to give the lowest probability of noise samples within the window from the range of channel tap lengths. In other words, the selected channel tap length gives the highest probability that the ratio of a power level of channel taps over a power level of noise within the window is maximized. The processor circuitry is configured to perform channel estimation from a reference signal sequence for the at least one reference signal and based on samples corresponding to the selected channel tap length. In some embodiments the step of performing the channel estimation is performed in conjunction with the receiver circuitry 710 and in other embodiments the channel estimation may be performed independently of the receiver circuitry, i.e. the channel estimation occur after the received signal is processed by the receiver circuitry.

The UE 700 may be further configured to perform any of the embodiments pertaining to a wireless receiver as disclosed above. Such embodiments may be combined in any combination providing improved channel estimation in a multi-layered, multi-user transmission environment.

Figure 8:
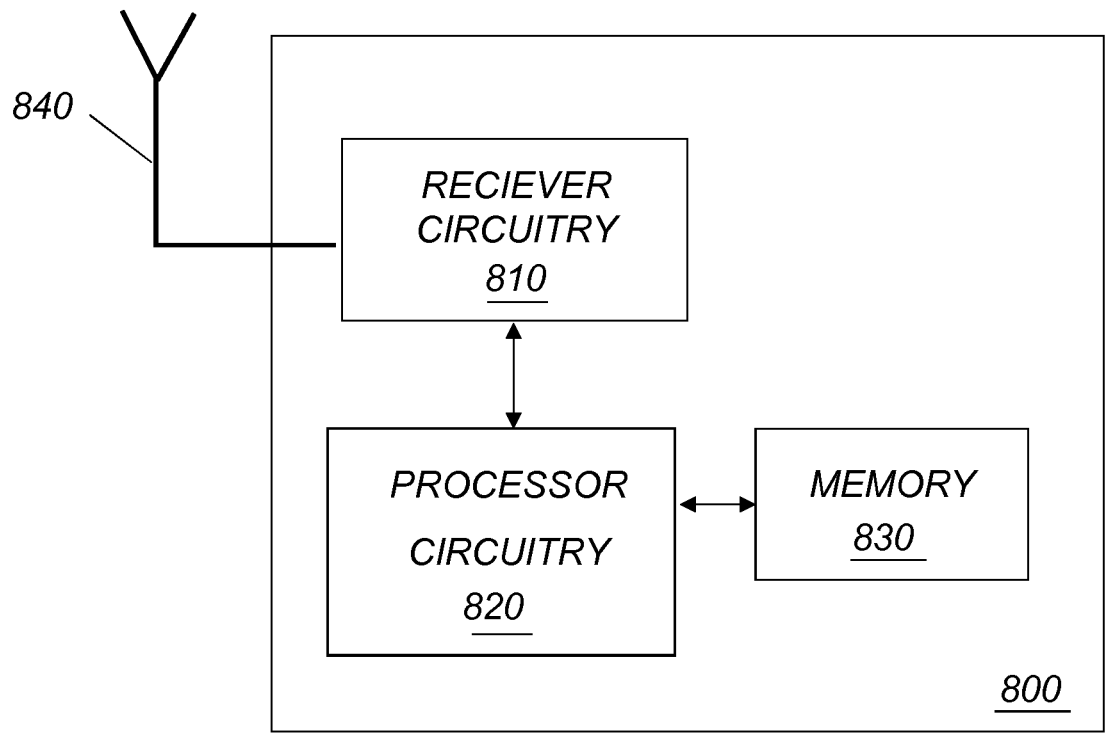
FIG. 8 is a block diagram illustrating example physical units a network node useful for implementing the methods described herein, according to one or more embodiments of the present disclosure.

FIG. 8 depicts an example network node or base station 800 as an example implementation of a wireless receiver for performing any one of the embodiments disclosed herein. The base station 800 comprising receiver circuitry 810, processor circuitry 820, a memory 830, and one or more antennas 840. The base station 800 may comprise multiple processor circuits, multiple memory circuits and multiple receiver circuits. The one or more antennas 840 may comprise multiple antenna elements as known by those skilled in the art to receive MIMO transmissions. The base station 800 may also comprise transmitter circuitry (not shown) and in some embodiments the receiver circuitry 810 is comprised within transceiver circuitry providing receive and transmit functions. The receiver circuitry is configured to receive one or more transmission layers via the one or more antennas and/or antenna elements.

The base station 800 is suitably arranged for estimating a channel in a multi-layer, multi-user transmission system. The receiver circuitry 810 is configured to receive a signal comprising a plurality of transmission layers, each layer comprising at least one reference signal according to a predefined reference signal sequence. The processor circuitry 820 is configured to determine a window size for performing a sampling operation wherein the operation is performed in a transformed domain of the received signal. The processer circuitry 820 is further configured to select a channel tap length, from a range of channel tap lengths, wherein the selection is based on the window size, a noise mean and a noise variance. The channel tap length can be selected to give the highest probability that the ratio of a power level of channel taps over a power level of noise within the window is maximized.

The processor circuitry is configured to perform channel estimation from a reference signal sequence for the at least one reference signal and based on samples corresponding to the selected channel tap length. In some embodiments the step of performing the channel estimation is performed in conjunction with the receiver circuitry 810 and in other embodiments the channel estimation may be performed independently of the receiver circuitry, i.e. the channel estimation occur after the received signal is processed by the receiver circuitry.

The base station 800 may be further configured to perform any of the embodiments pertaining to a wireless receiver as disclosed above. Such embodiments may be combined in any combination providing improved channel estimation in a multi-layered, multi-user transmission environment.

Figure 9:
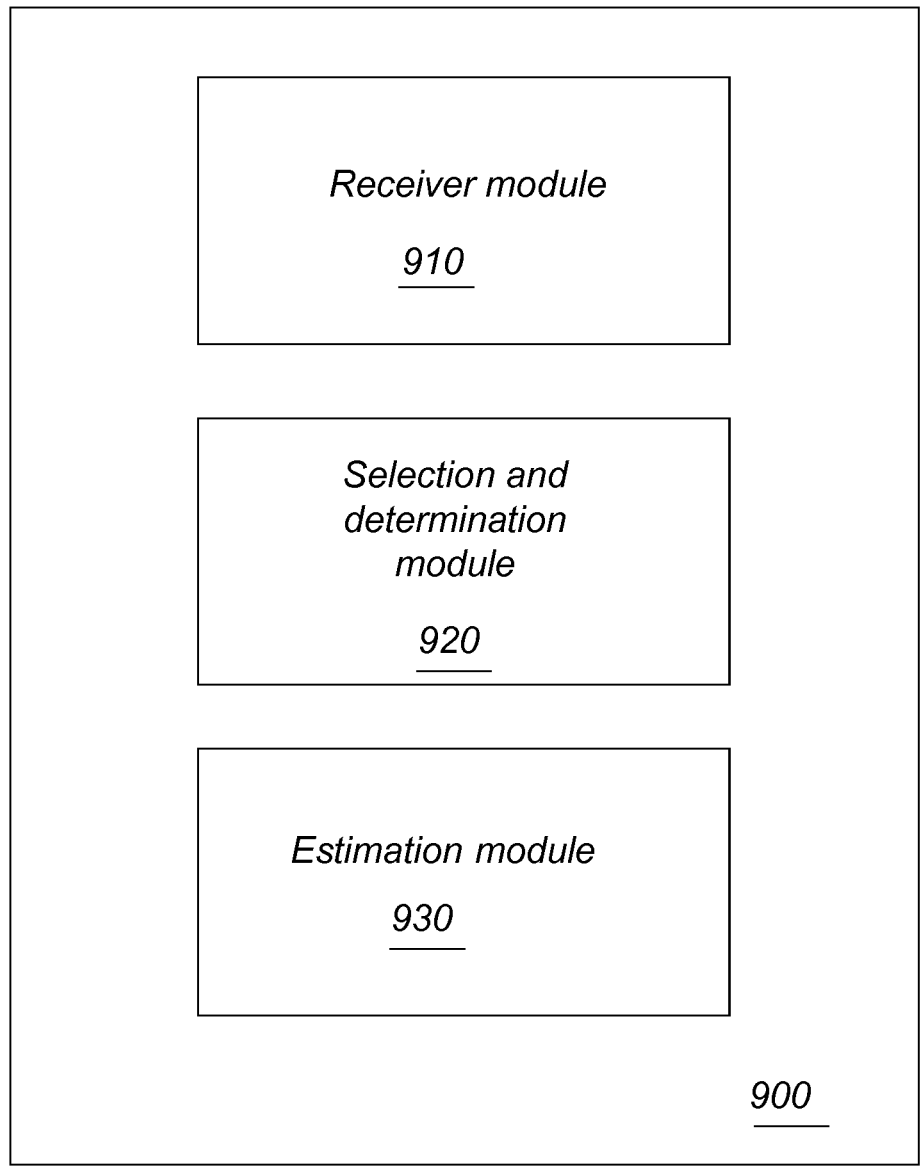
FIG. 9 is a block diagram illustrating example software modules of a device control application for implementing the methods described herein, according to one or more embodiments of the present disclosure.

FIG. 9 shows an example implementation of a wireless device or UE 900 suitable for performing any one of the embodiments disclosed herein. The UE 900 comprising a receiver module 910 arranged to receive a signal comprising a plurality of transmission layers, each layer comprising at least one reference signal according to a predefined reference signal sequence. The UE 900 further comprises a selection and determination module 920 which is configured to determine a window size for performing a sampling operation wherein the operation is performed in a transformed domain of the received signal. The selection and determination module 920 is further configured to select a channel tap length, from a range of channel tap lengths, wherein the selection is based on the window size, a noise mean and a noise variance. The channel tap length can be selected to give the highest probability that the ratio of a power level of channel taps over a power level of noise within the window is maximized. The UE 900 further comprises an estimation module 930 which is configured to perform channel estimation from a reference signal sequence for the at least one reference signal and based on samples corresponding to the selected channel tap length.

The UE 900 may be further configured to perform any of the methods pertaining to a wireless receiver as disclosed above. Such embodiments may be combined in any combination providing improved channel estimation in a multi-layered, multi-user transmission environment.

Figure 10:
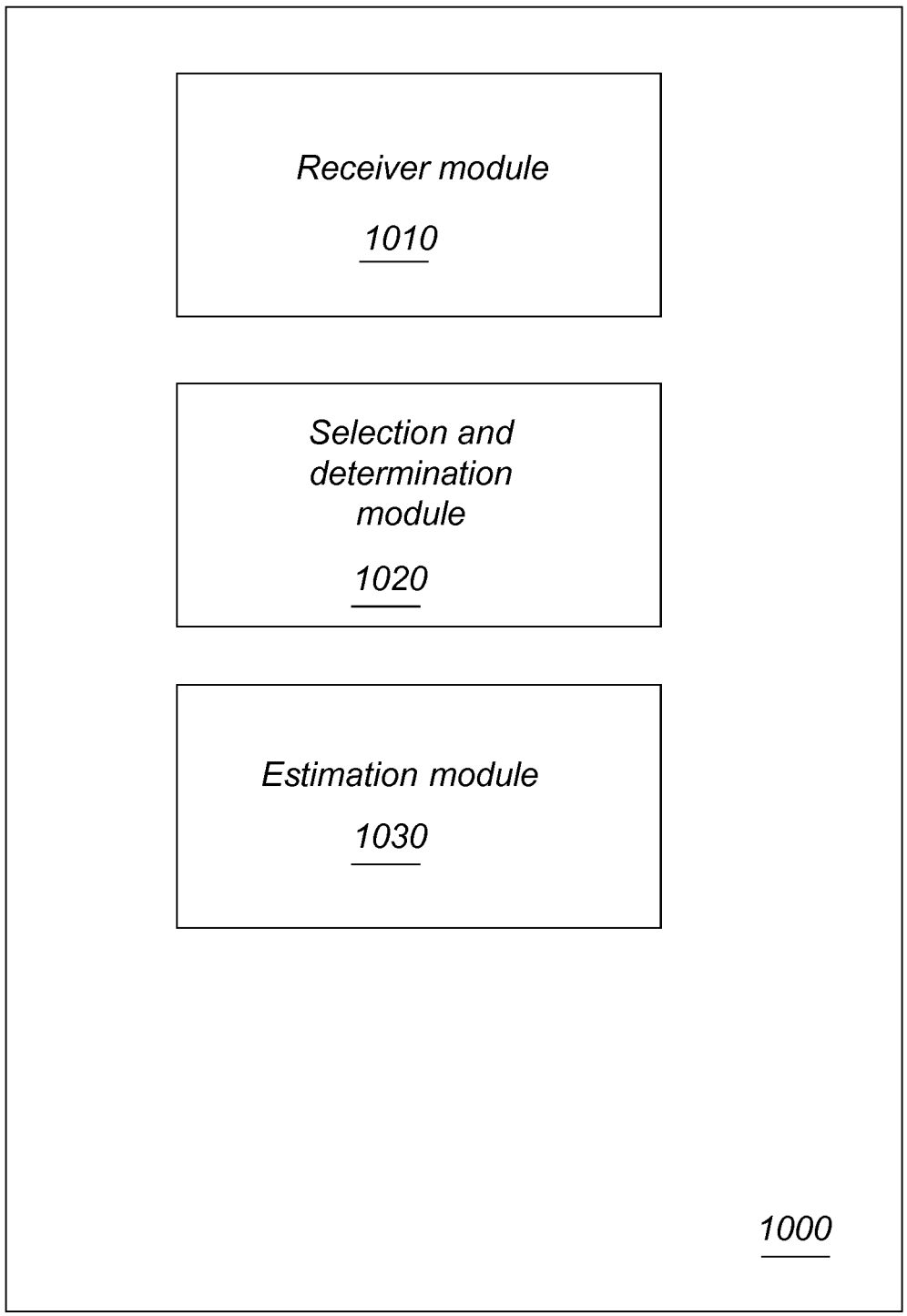
FIG. 10 is a block diagram illustrating example software modules of a network node control application useful for implementing the methods described herein, according to one or more embodiments of the present disclosure.

FIG. 10 shows an example implementation of a network node or base station 1000 suitable for performing any one of the embodiments disclosed herein. The base station 1000 comprising a receiver module 1010 arranged to receive a signal comprising a plurality of transmission layers, each layer comprising at least one reference signal according to a predefined reference signal sequence. The base station 1000 further comprises a selection and determination module 1020 which is configured to determine a window size for performing a sampling operation wherein the operation is performed in a transformed domain of the received signal. The selection and determination module 1020 is further configured to select a channel tap length, from a range of channel tap lengths, wherein the selection is based on the window size, a noise mean and a noise variance. The channel tap length can be selected to give the highest probability that the ratio of a power level of channel taps over a power level of noise within the window is maximized. The base station 1000 further comprises an estimation module 1030 which is configured to perform channel estimation from a reference signal sequence for the at least one reference signal and based on samples corresponding to the selected channel tap length.

The base station 1000 may be further configured to perform any of the methods pertaining to a wireless receiver as disclosed above. Such embodiments may be combined in any combination providing improved channel estimation in a multi-layered, multi-user transmission environment.

An aspect provides a computer program or program product for estimating a channel in a multi-layer, multi-user transmission system. The computer program comprises computer code or instructions which, when run on a computer or suitable processing circuitry of a wireless receiver, receives a signal comprising a plurality of transmission layers, each layer comprising at least one reference signal according to a predefined reference signal sequence, determines a window size for performing a sampling operation, wherein the operation is performed in a transformed domain of the received signal, selects a channel tap length, from a range of channel tap lengths, wherein the selection is based on the window size, a noise mean and a noise variance and performs a channel estimation from a reference signal sequence for the at least one reference signal and based on samples corresponding to the selected channel tap length.

The channel tap length can be selected to give the highest probability that the ratio of a power level of channel taps over a power level of noise within the window is maximized.

The computer program may be configured to perform any of the methods disclosed herein.

In other aspects the abovementioned computer program is stored in a device readable medium or storage device. Device readable medium may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium may store any suitable instructions, data or information, including a computer program, software, an application including one or more of logic, rules, code, tables, etc. and/or other instructions capable of being executed by processing circuitry and, utilized by network node. Device readable medium may be used to store any calculations made by processing circuitry and/or any data received. In some embodiments, processing circuitry and device readable medium may be considered to be integrated.

A further aspect of the disclosure provides a carrier containing a computer program comprising instructions which, when executed on at least one processor, causes the at least one processor to carry out the method according to any example disclosed herein. The carrier is one of an electronic signal, optical signal, radio signal, or computer readable storage medium.

Figure 11:
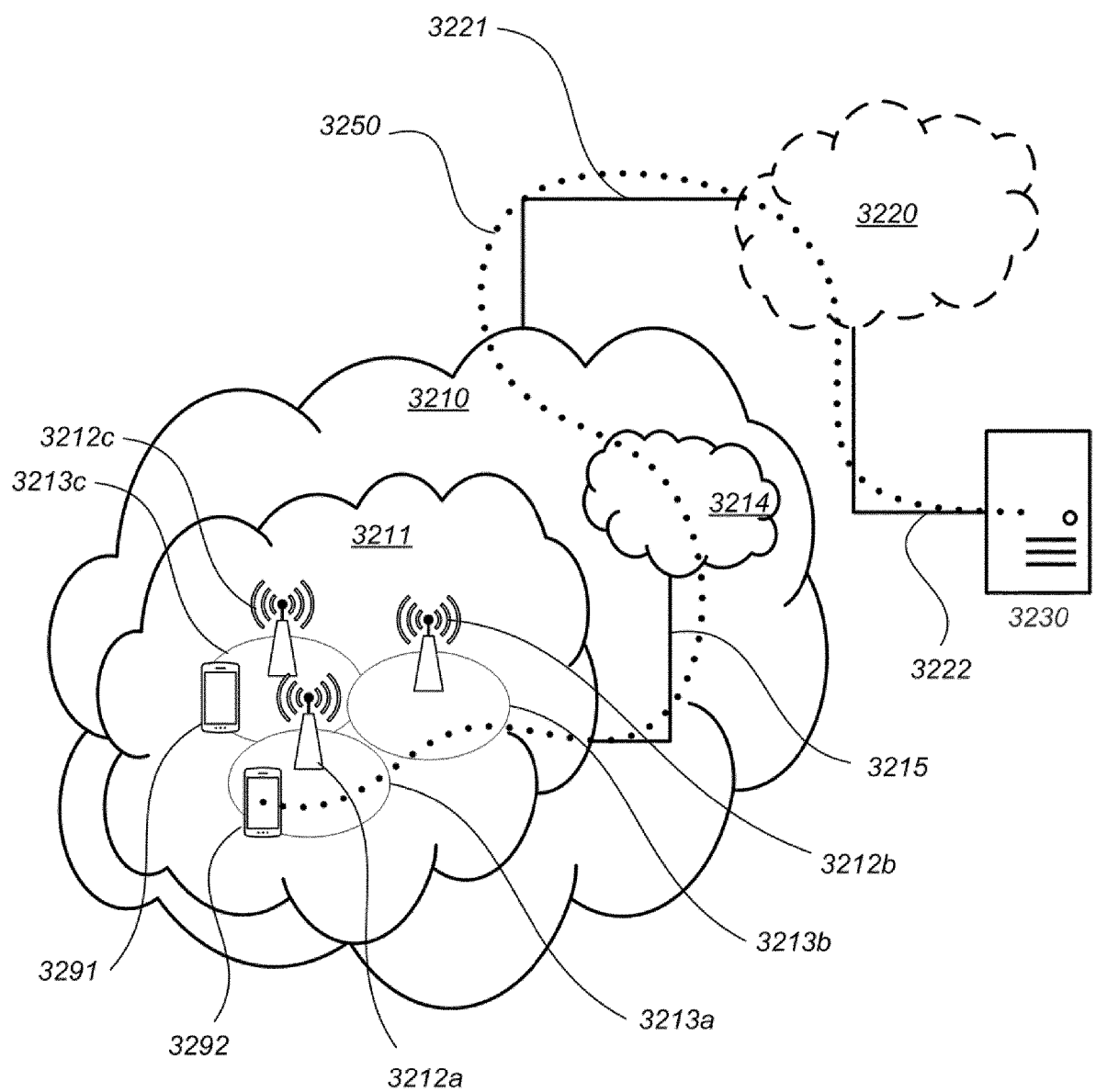
FIG. 11 schematically illustrates a telecommunication network connected via an intermediate network to a host computer.

With reference to FIG. 11, in accordance with an embodiment, a communication system includes a telecommunication network 3210, such as a 3GPP-type cellular network, which comprises an access network 3211, such as a radio access network or base station, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network. The intermediate network 3220, if any, may be a backbone network or the Internet; in particular, the intermediate network 3220 may comprise two or more sub-networks (not shown).

The communication system of FIG. 11, as a whole, enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. The hardware 3335 of the UE may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 18 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

Figure 12:
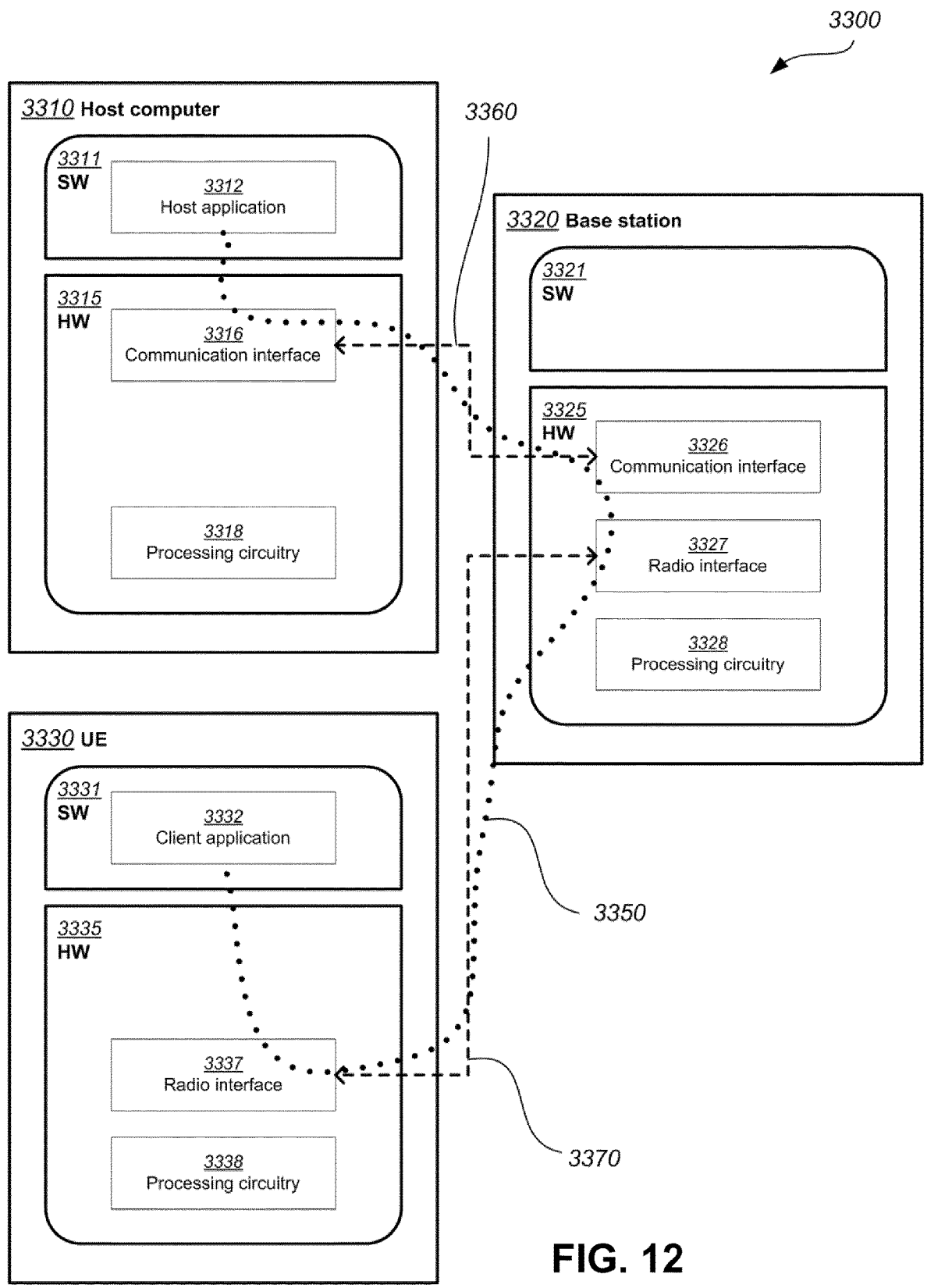
FIG. 12 is a generalized block diagram of a host computer communicating via a base station with a user equipment over a partially wireless connection.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, the routing may be configured to be hidden from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the radio access or base station availability and resource utilization, in particular allowing more layers to be used in MU-MIMO transmissions with increased reliability and throughput. With reduced signaling for scheduling this produced lower latency. This provides in turn benefits to the OTT service such as higher transmission rates, reduced user access time, faster response to user inputs, enables more users to access hosted services in close proximity to each other.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 13, 14:
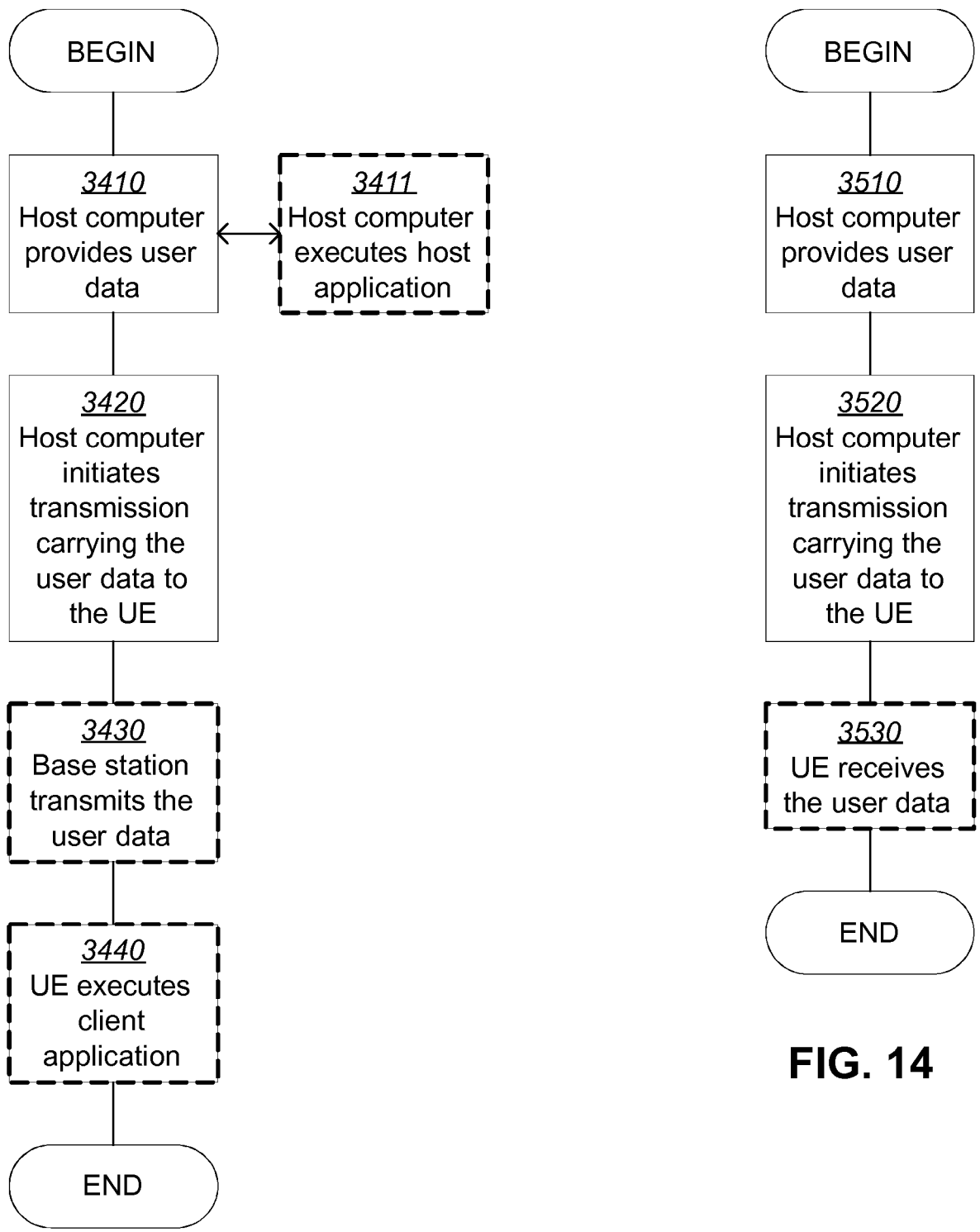
FIGS. 13 to 16 are flowcharts illustrating methods implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 15:
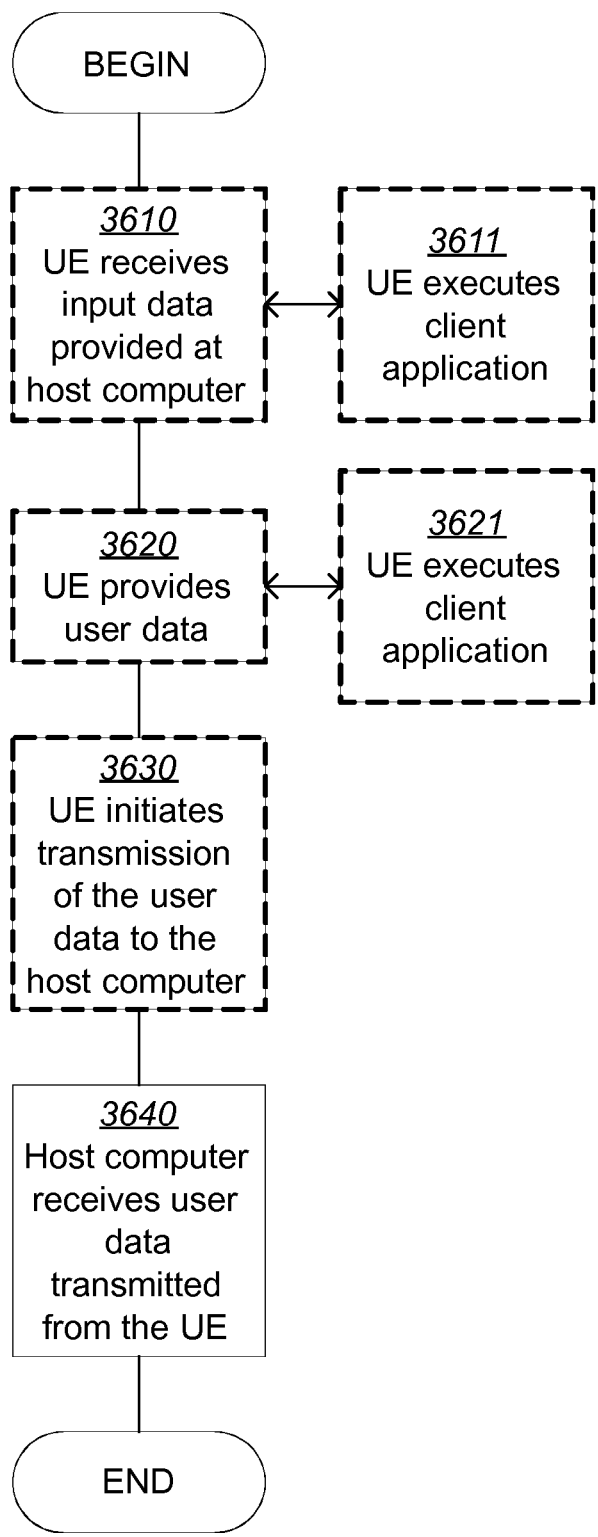
Figure 16:
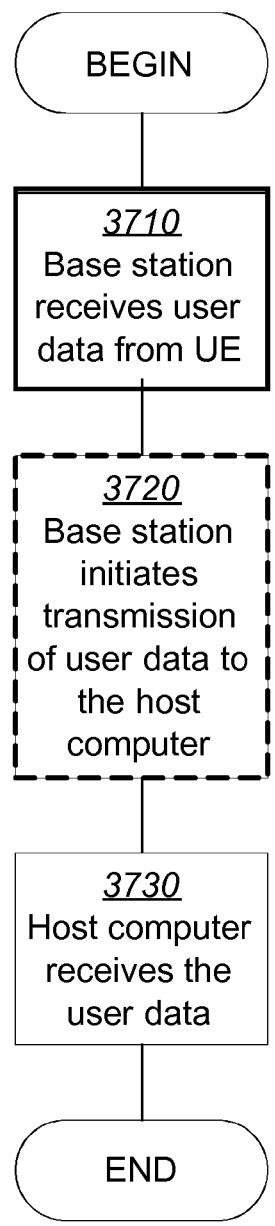

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In a first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Certain steps in FIGS. 13 to 15 are triggering the channel estimation methods of the previously described embodiments. These interactions are further exemplified below.

In some aspects, a communication system including a host computer and a wireless access system, wherein the wireless access system comprises multi-layer transmissions the communication system further comprises:
  a communication interface configured to receive user data originating from a transmission from a user equipment (UE) to a base station,
  wherein the UE comprises a radio interface and processing circuitry, the UE's processing circuitry configured to receive a signal comprising a plurality of transmission layers, each layer comprising at least one reference signal according to a predefined reference signal sequence;
  determine a window size for performing a sampling operation, wherein the operation is performed in a transformed domain of the received signal;
    select a channel tap length, from a range of channel tap lengths, wherein the selection is based on the window size, a noise mean and a noise variance;
    performing channel estimation from a reference signal sequence for the at least one reference signal and based on samples corresponding to the selected channel tap length. The channel estimation enabling the UE to decode and demultiplex multi-layer data transmissions with improved signal to noise and therefore reduce error.

The communications system further includes the base station, wherein the base station comprises a radio interface configured to communicate with the UE and a communication interface configured to forward to the host computer the user data carried by a transmission from the UE to the base station. The base station comprises a radio interface and processing circuitry, the base stations processing circuitry configured to:
  receive a signal comprising a plurality of transmission layers, each layer comprising at least one reference signal according to a predefined reference signal sequence;
  determine a window size for performing a sampling operation, wherein the operation is performed in a transformed domain of the received signal;
    select a channel tap length, from a range of channel tap lengths, wherein the selection is based on the window size, a noise mean and a noise variance;
    performing channel estimation from a reference signal sequence for the at least one reference signal and based on samples corresponding to the selected channel tap length. The channel estimation enabling the base station to decode and demultiplex multi-layer data transmissions with improved signal to noise and therefore reduce error.

In some aspects, the processing circuitry of the host computer is configured to execute a host application; and
  the UE's processing circuitry is configured to execute a client application associated with the host application, thereby providing the user data.

In some examples the processing circuitry of the host computer is configured to execute a host application, thereby providing request data; and
  the UE's processing circuitry is configured to execute a client application associated with the host application, thereby providing the user data in response to the request data.

In some aspects of the embodiments previously disclosed the wireless device or UE performs the uplink transmission which further comprises providing user data; and
  forwarding the user data to a host computer via the transmission to the base station.

In other aspects a method is implemented in a communication system including a host computer, a base station and a user equipment (UE), comprising a wireless access system, wherein the wireless access system comprises multi-layer transmissions, the method comprising:
  at the host computer, receiving user data transmitted to the base station from the UE, wherein the base station:

receives a signal comprising a plurality of transmission layers, each layer comprising at least one reference signal according to a predefined reference signal sequence;
determines a window size for performing a sampling operation, wherein the operation is performed in a transformed domain of the received signal;
selects a channel tap length, from a range of channel tap lengths, wherein the selection is based on the window size, a noise mean and a noise variance;
performs channel estimation from a reference signal sequence for the at least one reference signal and based on samples corresponding to the selected channel tap length.

In some examples the method further comprises:
at the UE, executing a client application, thereby providing the user data to be transmitted; and
at the host computer, executing a host application associated with the client application.

In further examples the method further comprises:
at the UE, executing a client application; and
at the UE, receiving input data to the client application, the input data being provided at the host computer by executing a host application associated with the client application,
wherein the user data to be transmitted is provided by the client application in response to the input data.

In some aspects, a communication system including a host computer and a wireless access system, wherein the wireless access system comprises multi-layer transmissions, the communication system further comprising a communication interface configured to receive user data originating from a transmission to a base station, wherein the base station comprises a radio interface and processing circuitry, the base station's processing circuitry configured to:
receive a signal comprising a plurality of transmission layers, each layer comprising at least one reference signal according to a predefined reference signal sequence;
determine a window size for performing a sampling operation, wherein the operation is performed in a transformed domain of the received signal;
select a channel tap length, from a range of channel tap lengths, wherein the selection is based on the window size, a noise mean and a noise variance;
perform channel estimation from a reference signal sequence for the at least one reference signal and based on samples corresponding to the selected channel tap length.

In further examples the communication system includes the UE, wherein the UE is configured to communicate with the base station.

In some examples the processing circuitry of the host computer is configured to execute a host application;
the UE is configured to execute a client application associated with the host application, thereby providing the user data to be received by the host computer.

In other aspects a method is implemented in a communication system including a host computer, a base station and a user equipment (UE), comprising a wireless access system, wherein the wireless access system comprises multi-layer transmissions, the method comprising:
at the host computer, receiving, from the base station, user data originating from a transmission which the base station has received from the UE, wherein the base station:
receives a signal comprising a plurality of transmission layers, each layer comprising at least one reference signal according to a predefined reference signal sequence;
determines a window size for performing a sampling operation, wherein the operation is performed in a transformed domain of the received signal;
selects a channel tap length, from a range of channel tap lengths, wherein the selection is based on the window size, a noise mean and a noise variance;
performs channel estimation from a reference signal sequence for the at least one reference signal and based on samples corresponding to the selected channel tap length.

The method may further comprise, at the base station, initiating a transmission of the received user data to the host computer.

In other aspects a method is implemented in a communication system including a host computer, a base station and a user equipment (UE), comprising a wireless access system, wherein the wireless access system comprises multi-layer transmissions, the method comprising:
at the host computer, initiating a transmission carrying the user data to the UE via a cellular network comprising the base station, wherein the UE:
receives a signal comprising a plurality of transmission layers, each layer comprising at least one reference signal according to a predefined reference signal sequence;
determines a window size for performing a sampling operation, wherein the operation is performed in a transformed domain of the received signal;
selects a channel tap length, from a range of channel tap lengths, wherein the selection is based on the window size, a noise mean and a noise variance;
performs channel estimation from a reference signal sequence for the at least one reference signal and based on samples corresponding to the selected channel tap length.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a wireless receiver for estimating a channel, the method comprising:
receiving a signal comprising a plurality of transmission layers, each layer comprising at least one reference signal according to a predefined reference signal sequence;
determining a window size for performing a selection operation, the operation being performed in one of a transformed domain and a time domain of the received signal;
selecting a channel tap length, from a range of channel tap lengths, the selection being based on the window size, a noise mean and a noise variance, the selected channel tap length, $l^*$, further being selected based on the computation:

$$l^* = \arg\min_{1\leq l\leq L}\{L\times\log(\hat{\sigma}^2)+l\times(\hat{\mu}^2/\hat{\sigma}^2)\};$$

L is the window size, l is a channel tap length in the range 1 to L, $\hat{\mu}^2$ is an estimated noise mean and $\hat{\sigma}^2$ is an estimated noise variance, from data samples in a window of size L; and performing channel estimation from the predefined reference signal sequence in a frequency domain for the at least one reference signal and based on samples corresponding to the selected channel tap length.

2. The method according to claim 1, wherein the window size and channel tap length are dynamically adapted based on channel conditions.

3. The method according to claim 1, wherein the window size is determined based on one or more of:
- a maximum channel dispersion in the transformed domain;
- a cross-layer interference distribution in the transformed domain; and
- an estimate of the noise mean and the noise variance.

4. The method according to claim 1, wherein the window size is the minimum of:
- an equivalent Cyclic-Prefix, CP, length in the transformed domain; and
- an interference-free taps length,
- wherein one of frequency domain orthogonal cover codes, OCCs, and cyclic shift, CS, is used for multiplexing the layers.

5. The method according to claim 1, wherein data samples are sorted in the transformed domain before determining the window size and a window is determined based on the sorted samples.

6. The method according to claim 1, wherein the channel estimation comprises the receiver performing an inverse discrete cosine transform, IDCT, operation of size L on a vector $\bar{h}_k$, for a layer k, wherein
the vector $\bar{h}_k \triangleq [\hat{h}_k^H(1:l^*_k)\ 0_{L-l^*_k}^H]^H$; wherein $\hat{h}_k^H(1:l^*_k)$ is a vector of the first $l^*_k$ elements, wherein $l^*_k$ is the selected channel tap length for layer k and $0_{L-l^*_k}$ is an all-zero vector of length $L-l^*_k$.

7. The method according to claim 1, wherein a noise mean value is estimated, $\hat{\mu}_k$, for layer k, and for a channel tap length, l, by:

$$\hat{\mu}_k = \frac{1}{L-l}\sum_{m=l+1}^{L}\hat{h}_k[m];$$

wherein, L is a multiple of the number of occupied elements of the layer k, and $\hat{h}_k[m]$ is a vector obtained from a discrete cosine transform, DCT, of a point-wise multiplication of at least one reference signal vector with a conjugate of a reference signal vector sequence.

8. The method according to claim 1, wherein the noise variance is estimated, $\hat{\sigma}_k^2$, for a channel tap length l, by:

$$\hat{\sigma}_k^2 = \frac{1}{L-l-c}\sum_{m=l+1}^{L}|\hat{h}_k[m]-\hat{\mu}_k|^2;$$

wherein, L is a multiple of the number of occupied elements of the layer k, and $\hat{h}_k[m]$ is a vector obtained from a discrete cosine transform, DCT, of a point-wise multiplication of at least one reference signal vector with a conjugate of a reference signal vector sequence, $\hat{\mu}_k$ is a predetermined noise mean or an estimated noise mean value and c is a constant such that $$\frac{1}{L-l-c}$$

is positive, wherein the noise variance estimate $\hat{\sigma}_k^2$ is multiplied with a quantity $q^2(l)$ before being used for selecting the channel tap length,
wherein:

$$q(l) \triangleq \frac{\sqrt{\frac{L-l-1}{2}}\ \Gamma\left(\frac{L-l-1}{2}\right)}{\Gamma\left(\frac{L-l}{2}\right)};$$

and $\Gamma(x)=\int_0^\infty t^{x-1}e^{-t}dt$ is the gamma function.

9. The method according to claim 1, wherein the receiver combines metrics $l^*_k$ where $l^*_k$ is the channel tap length of layer k as given by:

$$l^* = \arg\min_{1\leq l\leq L}\{L\times\log(\hat{\sigma}^2)+l\times(\hat{\mu}^2/\hat{\sigma}^2)\}$$

wherein L is the window size, l is a channel tap length in the range 1 to L, $\hat{\mu}^2$ is an estimated noise mean and $\hat{\sigma}^2$ is an estimated noise variance, from data samples in a window of size L from all layers and reference signals by averaging or summing them to create a composite metric.

10. The method according to claim 9, wherein the composite metric is according to:

$$l^* \triangleq \arg\min_{1\leq l\leq L}\sum_{k=1}^{K}L_k(\hat{h}_k,l)$$

or:

$$l^* \triangleq \arg\min_{1\leq l\leq L}(1/K)\sum_{k=1}^{K}L_k(\hat{h}_k,l);$$

wherein $L_k$ is a window size for layer k, K is a number of layers, $\hat{h}_k$ is a vector obtained from a discrete cosine transform, DCT, of a point-wise multiplication of at least one reference signal vector with a conjugate of a reference signal vector sequence, and wherein an estimated channel length, measured in number of taps, is the same for all layers.

11. The method according to claim 1, wherein the wireless receiver is comprised in any one of a user equipment and a base station.

12. A wireless receiver configured for estimating a channel, the wireless receiver comprising:
- receiver circuitry;
- processor circuitry; and
- memory;
- the receiver circuitry being configured to:
  - receive a signal comprising a plurality of transmission layers, each layer comprising at least one reference signal according to a predefined reference signal sequence; and
- the processor circuitry is configured to:
  - determine a window size for performing a sampling operation wherein the operation is performed in a transformed domain of the received signal;
  - select a channel tap length, from a range of channel tap lengths, the selection is being based on the window size, a noise mean and a noise variance, the channel tap length, l*, selection further being based on the computation:

$$l^* = \arg\min_{1 \leq l \leq L} \{L \times \log(\hat{\sigma}^2) + l \times (\hat{\mu}^2/\hat{\sigma}^2)\};$$

wherein L is the window size, l is a channel tap length in the range 1 to L, $\hat{\mu}^2$ is an estimated noise mean and $\hat{\sigma}^2$ is an estimated noise variance, from data samples in a window of size L; and
  - perform channel estimation from the predefined reference signal sequence in a frequency domain for the at least one reference signal and based on samples corresponding to the selected channel tap length.

13. The wireless receiver according to claim 12, wherein the receiver is comprised in any one of a user equipment and a base station.

14. The wireless receiver according to claim 12, wherein the window size and channel tap length are dynamically adapted based on channel conditions.

15. The wireless receiver according to claim 12, wherein the window size is determined based on one or more of:
- a maximum channel dispersion in the transformed domain;
- a cross-layer interference distribution in the transformed domain; and
- an estimate of the noise mean and the noise variance.

16. The wireless receiver according to claim 12, wherein the window size is the minimum of:
- an equivalent Cyclic-Prefix, CP, length in the transformed domain; and
- an interference-free taps length, wherein one of frequency domain orthogonal cover codes, OCCs, and cyclic shift, CS, is used for multiplexing the layers.

17. The wireless receiver according to claim 12, wherein data samples are sorted in the transformed domain before determining the window size and a window is determined based on the sorted samples.

18. A non-transitory computer-readable storage medium storing an executable computer program that, when run on a computer, performs a method for estimating a channel, the method comprising:
- receiving a signal comprising a plurality of transmission layers, each layer comprising at least one reference signal according to a predefined reference signal sequence;
- determining a window size for performing a selection operation, the operation being performed in one of a transformed domain and a time domain of the received signal;
- selecting a channel tap length, from a range of channel tap lengths, the selection being based on the window size, a noise mean and a noise variance, the channel tap length, l*, selection further being based on the computation:

$$l^* = \arg\min_{1 \leq l \leq L} \{L \times \log(\hat{\sigma}^2) + l \times (\hat{\mu}^2/\hat{\sigma}^2)\};$$

wherein L is the window size, l is a channel tap length in the range 1 to L, $\hat{\mu}^2$ is an estimated noise mean and $\hat{\sigma}^2$ is an estimated noise variance, from data samples in a window of size L; and
- performing channel estimation from the predefined reference signal sequence in a frequency domain for the at least one reference signal and based on samples corresponding to the selected channel tap length.

* * * * *